(12) United States Patent
Creighton et al.

(10) Patent No.: US 8,161,452 B2
(45) Date of Patent: Apr. 17, 2012

(54) SOFTWARE CINEMA

(75) Inventors: Oliver Creighton, Munich (DE); Bernd Bruegge, Feldafing (DE); Christoph Angerer, Bergkirchen (DE); Tobias Kluepfel, Munich (DE); Martin Ott, Guenzburg (DE); Martin Pittenauer, Vaterstetten (DE); Dominik Wagner, Munich (DE)

(73) Assignee: Oliver Creighton, Munich (DE)

(*) Notice: Subject to any disclaimer, the term of this patent is extended or adjusted under 35 U.S.C. 154(b) by 971 days.

(21) Appl. No.: 11/911,938

(22) PCT Filed: Apr. 19, 2006

(86) PCT No.: PCT/EP2006/003586
§ 371 (c)(1),
(2), (4) Date: Jun. 13, 2008

(87) PCT Pub. No.: WO2006/111374
PCT Pub. Date: Oct. 26, 2006

(65) Prior Publication Data
US 2008/0288913 A1 Nov. 20, 2008

(30) Foreign Application Priority Data
Apr. 19, 2005 (EP) .................................. 05008573

(51) Int. Cl.
*G06F 9/44* (2006.01)
(52) U.S. Cl. ........ 717/100; 717/104; 717/105; 717/108; 717/110; 348/700; 348/701; 382/171; 382/168
(58) Field of Classification Search ................. 717/100, 717/104, 105, 108, 110; 382/168, 171
See application file for complete search history.

(56) References Cited

U.S. PATENT DOCUMENTS
| | | | |
|---|---|---|---|
| 6,584,470 B2 * | 6/2003 | Veale | 1/1 |
| 2004/0205703 A1 * | 10/2004 | Harel et al. | 717/109 |
| 2006/0059510 A1 * | 3/2006 | Huang et al. | 725/32 |

OTHER PUBLICATIONS

Cinema 2, The Time-Image, Gilles Deleuze. University of Minesota press, Minneapolis, 1985.*
Gomaa, Designing concurrent, distributed, and real-time application with UML, p. 119-134, p. 423-437, (2000).*
Gramma, Design patterns: Elements od reusable object-oriented software, p. 151-155, p. 223-226(2001).*
Mackay, W.E., et al., "Video Artifacts for Design: Bridging the Gap Between Abstraction and Detail". DIS 2000, Brooklyn, New York. pp. 72-82.

(Continued)

*Primary Examiner* — Don Wong
*Assistant Examiner* — Lynda Dinh
(74) *Attorney, Agent, or Firm* — Fox Rothschild, LLP; Robert J. Sacco

(57) ABSTRACT

The invention comprises a system and method for employing video in development processes. A new theory of operation for mapping video to formal models is disclosed. The present invention combines a runtime component and an object memory with an transformer component and offers several inputs and outputs. At least one capture device allows input of video. Video is structurally decomposed into shots and annotated following a semiology-based video model and stored in object memory. A runtime component determines the shots that are played back on one or more displays. A spectator may influence the runtime component by changing its state via at least one controller. One or more downstream development processes can access the object memory to extract customary models for requirements specification.

8 Claims, 14 Drawing Sheets

OTHER PUBLICATIONS

Figure 1:
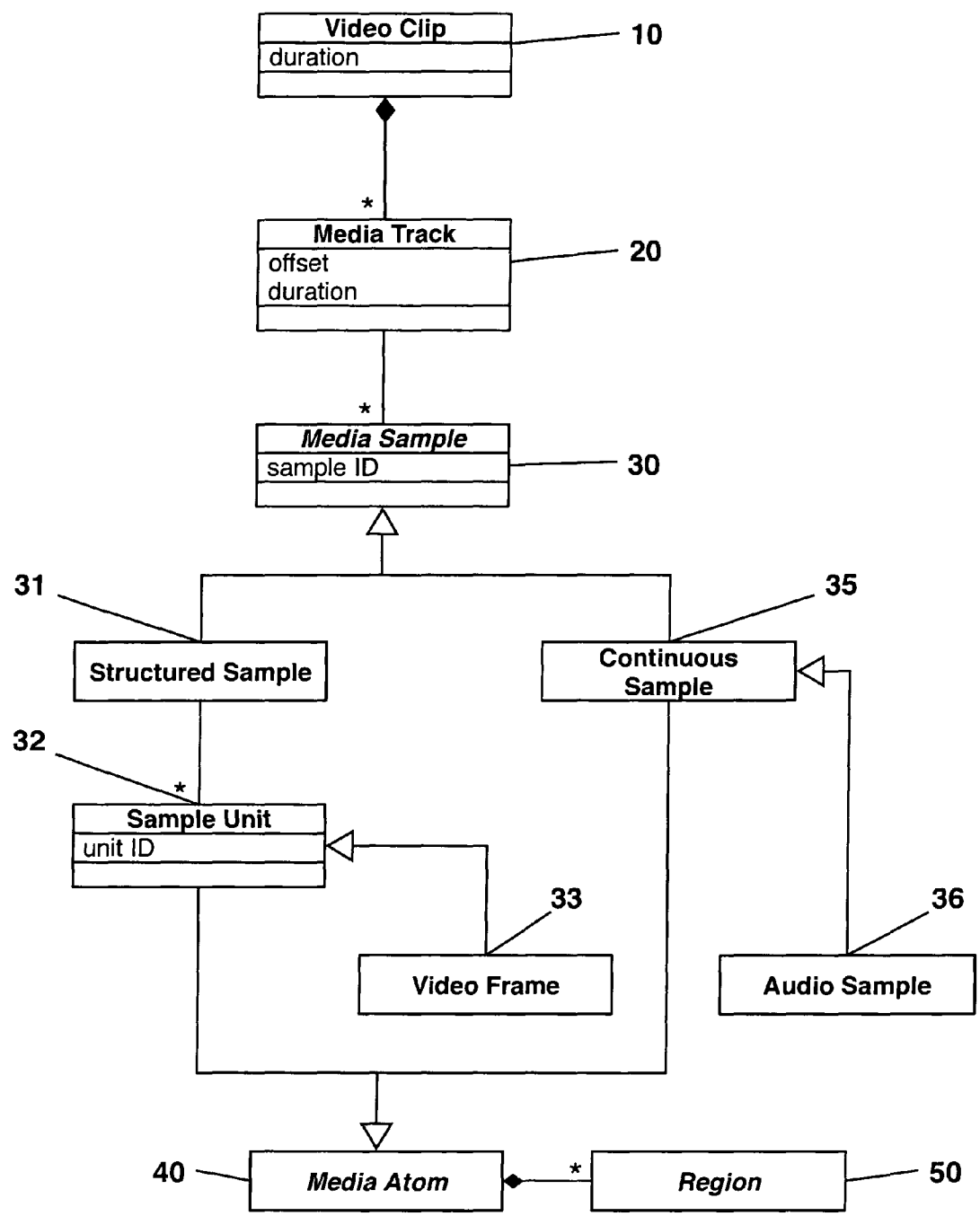

Binder, T., "Setting the Stage for Improvised Video Scenarios", CHI '99 May 15-20, 1999. ACM Press 1999. pp. 230-231.

Stotts, D., et al., "Semi-Automated Hyperlink Markup for Archived Video". Proceedings of the 13 ACM conerencf on Hypertext and Hypermedia (HT '02) pp. 105-106, ACM Press, Jun. 2002. Available from: <<http://doi.acm.org/10/1145/513338.513367>>.

Wahl, T., et al., "Representing Time in Multimedia Systems". IEEE 1st Int'l Conference on Multimedia Computing and Systems, Boston, MA, May 14-19, 1994.

Weiser, M. "The Computer for the 21st Century". Scientific American, Sep. 1991, 265(3): 94-104.

* cited by examiner

SOFTWARE CINEMA

CROSS-REFERENCE TO PRIOR APPLICATION

This is a U.S. National Phase Application under 35 U.S.C. §371 of International Patent Application No. PCT/EP2006/003586 filed Apr. 19, 2006, which claims the benefit of European Patent Application No. 05008573.3 filed Apr. 19, 2005, both of which are incorporated by reference herein. The International Application was published in English on Oct. 26, 2006 as WO 2006/111374 A2.

This invention relates to development processes, specifically to innovation and enhancement projects of software-intensive systems. It is based on a new semiology-based video model and established models for requirements specifications.

This invention is based on Prior Art in software process modeling, film theory, and multimedia technology. Modeling is required for software development projects of high complexity, stemming from either a complex system to be constructed or a complex organizational structure of the developer or customer organizations. Modeling techniques and languages, as standardized by the Object Management Group, provide the foundation for a rational suggestion of new systems or methods, such as the present invention. In particular, the reduction of bureaucracies and a more holistic approach of developer involvement was the intention of the present invention. A novel application of semiotics to film theory provided a key to the new theory of operation.

Prior art in digital video modeling, indexing, querying, and other content-based processing of digital video data have resulted in the ability to handle large amounts of digital video content, a prerequisite to the present invention.

In requirements development, analysts and end-users still encounter a variety of difficulties when trying to communicate about the wishes, requirements and constraints that end-users have. In the early phases of a software development project, a model of reality needs to be constructed, which is powerful enough to express the end-users' requirements as well as relevant parts of the environment. Model languages that are derived from lower-level descriptions of existing hardware/software solutions might never be able to express the desired solution. If, for example, a solution calls for a fundamentally different hardware component that has never been used in a software system before—such as clothing, walls, or roads—software model languages can only contain weak representations for these 'out-of-scope' components.

In requirements elicitation, the requirements analyst constructs a model of the application domain. This model is then validated with the end-user. To enable this, application domain knowledge must be transferred from the end-user to the analyst. After this transfer is complete, and the analyst's model of the application domain is validated by the end-user, the analyst uses his information to generate a specification, which the developer uses to design and implement the solution. The analyst and the end-user may have largely different backgrounds, hence a gap exists in the mental conceptions and viewpoints of these two actors. Consequently, modeling the application domain with a notation that emerged from ever more abstract models of computer-based solutions can only lead to a restricted field of future systems that are all alike. In contrast, Weiser called for fundamentally different computers 'for the 21st century:' "The most profound technologies are those that disappear. They weave themselves into the fabric of everyday life until they are indistinguishable from it." (Mark Weiser. The computer for the 21st century. *Scientific American,* 265(3):94-104, September 1991.) Such systems are invisible to end-users. They are sometimes referred to as 'blue collar' systems, because the end-users are people carrying out ordinary activities in everyday life and are typically unfamiliar with computer usage or may not even be aware of the existence of computational elements in their environment. The union of wearable und ubiquitous systems shifts our focus from the machines to the people, who are now the mobile agents and potentially carry diverse parts of the overall system with them.

But how do you model interaction with something that is invisible? How do you validate your application domain model with end-users that won't be able to distinguish using the system from their everyday life? What is called for is a technique for modeling the application domain in ways that are natural to end-users, as opposed to models that are natural to developers. It should facilitate the necessary knowledge transfer of the real end-user requirements to developers. Moreover, a modeling activity on the end-user side of the gap would bring better control of modifications and validations. It is established that the application domain changes over time, as work processes and people change. A change in the application domain should be addressed, remodeled, and validated within the domain of end-users without actually having to build a complete and working system.

The present invention presents a novel technology to employ digital video for this purpose. In digital video, tracks combine data of different types into a single video experience. Each track structures a certain type of media data: video tracks, audio tracks, subtitle tracks, or other time-based data. A track begins at a certain time after the beginning of a clip and is played for a certain duration. The media data is organized sequentially within those tracks. Chunks of such media data of the same type are called 'media samples.'

All media samples cover a certain period of time. Some types of media samples—such as audio samples—are seen as self-contained continuous streams of media data. Other sample types need to further divide the media data into sequences of sample units—for example, video samples consist of single frames of video. The smallest unit of media data is called a 'media atom.' Media atoms are the basic elements of digital video.

A model of digital video is shown in FIG. 1. A Video Clip 10 consists of several Media Tracks 20. Each media track represents a sequence of Media Samples 30 of the same type. Media samples are either Continuous Samples 35 or Structured Samples 31 that structure their data in a sequence of Sample Units 32. A single Media Atom 40 of digital video is, in turn, either such a Continuous Sample 35 or a Sample Unit 32 within a Structured Sample 31.

It is often necessary to reference only certain regions of single media atoms. For example, a region of a single frame 33 which depicts the character 'Bob' or a region of an audio sample 36 which plays a single explosion sound. We therefore introduce the notion of a Region 50 that represents a part of a referenced media atom 40. Extensive research efforts have gone into automatic digital video annotation and feature extraction. These approaches provide querying languages for digital video or image retrieval.

The spatial context is restricted to two dimensions, as digital video is still a medium that by and large consists only of a series of images. These images are taken from one camera position, usually through a lens, and can after digitization be represented as rows and columns of pixels. All photographed objects are therefore reduced to pixel regions. No information of their physical relation to each other is captured other than what can be seen from the camera's perspective. The digitization process also requires the quantization of color information of every single pixel.

The temporal context is given as the point in time of when a single image is shown in a stream of images. This is a relative measure from the start of a digital video and can sometimes be matched to the point in time when the image was taken.

Hence, the resolution of digital video can be measured along three dimensions: pixels per inch, color depth, and frames per second. Video models that allow querying or image retrieval represent an abstraction of these technicalities by indexing extracted features. Cuts in digital video, for example, can be detected by calculating similarity measures between consecutive frames. Is the difference above a certain threshold, a change in perspective is very likely.

The intention of requirements engineering is to construct a useful model of that part of the world in which the envisioned solution will exist—the application domain. These models are needed to verify the validity of a solution and its applicability to the problem at hand. The activity in which data about the context, conditions, and intended use of a solution is collected is called requirements elicitation. Requirements analysis is an activity that takes into account all information that has been collected up to a point and tries to make sense of it. This includes the creation of a model of the requirements that can be checked cognitively or formally against conceptual models of the requirements engineering process, such as completeness, correctness, or consistency. Every model has to be checked against reality. For requirements engineers, this can be done in a variety of ways. A popular and successful approach is prototyping.

A very common form of prototyping in the context of software development is nowadays GUI (Graphical User Interface) prototyping. The term is often combined with a glimpse at the employed software process, when developers speak of rapid prototyping. This usually means that developers employ a framework or class library that handles the management of the basic elements of the interface. A matching Integrated Development Environment enables to sketch out the GUI very early in the project, but with the final look and feel and usually already with class stubs or even some functionality of standard GUI components.

An interesting approach towards GUI prototyping that goes beyond mere graphical design is presented by Harel and Marelly (David Harel and Rami Marelly. *Come, Let's Play: Scenario-Based Programming Using LSCs and the Play-Engine*. Springer-Verlag, August 2003, and David Harel and Rami Marelly. Playing in scenarios of system behavior, October 2004. U.S. Patent Application 2004/0205703 A1). Based on the formal definition of Live Sequence Charts (LSCs), two techniques that are supported by a tool called 'Play-Engine' allow to 'play in' scenario-based behavior and to 'play out' the sum of all played-in information to allow verification of the modeled behavior. These techniques allow programming on a high level of abstraction, essentially creating a rich base of rules that the reactive system needs to adhere to. A model-checking algorithm enables 'smart' selection of rules in case of ambiguities, when more than one LSC could be executed. It assures that if a stable, non-aborting state can be reached by the right sequencing of events, this sequence is chosen for play-out. If no such sequence exists in the current model, the algorithm proves that this is impossible.

Harel and Marelly argue that this enables developers to capture and model requirements for reactive systems from a nonfunctional GUI prototype in a more intuitive way than earlier specification techniques. One embodiment of the present invention is a natural front-end to this type of model-based requirements capture, as we do not base the technique on a predetermined structure of the application domain. On the contrary, the described Software Cinema technique is meant to be employed for capturing broader concepts and more contextual information than could be useful for the 'Play-Engine.' In essence, the Software Cinema technique can provide analysts a guideline for identifying components and their relationships, making it possible to continue with model-based requirements specification as described by Harel and Marelly.

Mackay (Wendy E. Mackay, Anne V. Ratzer, and Paul Janecek. Video artifacts for design: Bridging the gap between abstraction and detail. In *Proceedings of the Conference on Designing Interactive Systems (DIS 2000)*. ACM Press, 2000, pages 72-82) has been using videos for requirements analyses over a decade. Mackay et. al. discuss a video-based design process for innovative systems as well as for enhancement of existing systems. They present the use of video artifacts in a design process. As soon as a new design has been prototyped, potential end-users are asked to work on specific tasks with the new design. These activities are filmed and analyzed in detail.

As described, video prototyping is a useful technique to become more familiar with an application domain. This is a required first step for analysts or developers who are supposed to also offer a model of the solution. Bridging the gap between application domain and solution domain is of no relevance to video prototyping as described in prior art, as is was strictly focused on just the outward design of new inventions. However, the focus on the details of end-user reality can assist analysts, designers, and developers in finding the best-possible solution for any given problem. This stands in contrast to the common over-application of 'standard' solutions that do not really solve end-users' problems.

Another example that shows how videos can help the requirements process is given by Binder (Thomas Binder. Setting the stage for improvised video scenarios. In *CHI '99 Extended Abstracts on Human Factors in Computer Systems*, pages 230-231. ACM Press, 1999). Also following a theatrical metaphor for collaborative exploration of new design possibilities and videotaping such improvisations, he shows how end-users can contribute to the design process. He worked with an electrician who improvised working with a new industrial Personal Digital Assistant (PDA) (a foam mock-up) in his regular work environment.

An object of the invention is to avoid the problems of the prior art at least in part. In particular, the invention supports and/or automates the development of products or processes by modeling properties of the product and/or process and/or its application domain. The product may be, e.g., a software program or an electronic apparatus or a mixed software/hardware system, and the process may be, e.g., a business process.

According to the invention, the above object is solved, wholly or in part, by methods, systems and computer program products having the features of the independent claims. The dependent claims define optional features of some embodiments of the invention.

The invention comprises a system and method for employing time-based media in a development process. It thereby aids in bridging the gap between envisioned reality and implemented systems.

The inventors have realized that it seems possible and useful to watch potential end-users performing envisioned activities in the actual environment they will be performing them in. It helps to identify complex interactions of the envisioned system before even a simple model of the application domain has been constructed. One embodiment of the present invention exploits the fact that a model is not needed when putting the visionary system in the actual reality of a potential work environment.

The use video as a storable medium in some embodiments of the invention allows to replay it to other stakeholders, in particular to developers. This makes it possible to transport richer information about the envisioned solution and all of the application domain, which enables shorter turn-around times.

Video as a design and specification medium is often underestimated. Mackay et. al. describe how participants of video brainstorming session can rarely imagine the usefulness in the beginning. But this is obviously a misconception of the clarity that a video can express. The fuzziness of early visionary ideas overshadows the directness and honesty of what a video already contains.

Finally, the video prototyping field also proves that the reach of video prototypes is quite large. It allows to involve a larger audience in early feedback loops than other prototyping techniques that require a prototypical system to be installed, maintained, and explained to potential users. A video prototype can simply be shown and feedback on it can be collected without any more effort than playing back a DVD at home. When the population of potential end-users who should give feedback is also globally distributed, the back channel can also be based on video. This only requires—apart from a playback facility—a means to capture video, which today is as easy as installing a cheap webcam.

The following explanations of some terms are intented to provide a better understanding of the present document and of some embodiments of the invention. However, the present invention in its most general sense is not limited to the explanations as given below.

Movie: In some embodiments, the semantic term for a motion picture or film. This is defined as the conceptual unity of several scene that have been put together and can be talked about as a whole (considering plot, actors, action, and other cinematographical terms).

Requirements Analysis Video (RAV): In some embodiments, the outcome of the Software Cinema requirements elicitation and analysis technique. It is a non-linear, annotated, and partly interactive digital video. It supersedes the Requirements Analysis Document when applying the Software Cinema technique.

Scene: In some embodiments, the cinematic, i.e. Software Cinema application domain, term for a unity of several shot that are edited to all show the same location or environment in chronological order without leaps in time, but possibly from different perspectives. For example, a traditional Hollywood-style edited dialogue with shots and countershots of two actors is called one scene. In Software Cinema, an instance of the entire sequence of events of exactly one use case is called one scene.

Shot: In some embodiments, the cinematic, i.e. Software Cinema application domain, term that designates a contiguous sequence of pictures from one camera perspective. For example, the series of pictures that are on a film roll beginning with the clapper and ending with the yelling of 'cut' by the director is called one shot. In Software Cinema, a digital video sequence of unspecified length, but with contiguous time code, is called one shot. It is the term that the Software Cinematographer understands and uses.

Signifier: In some embodiments, the named collection of audio-visual video elements within a shot, which have been grouped together under some criteria derived from the application domain knowledge that is perceptible in a specified time interval.

The computer program product of the present invention may be embodied on any kind of physical or non-physical data carrier like, for example, a computer disk or a CD-ROM or a semiconductor memory or a signal transmitted over a computer network.

Figure 2:
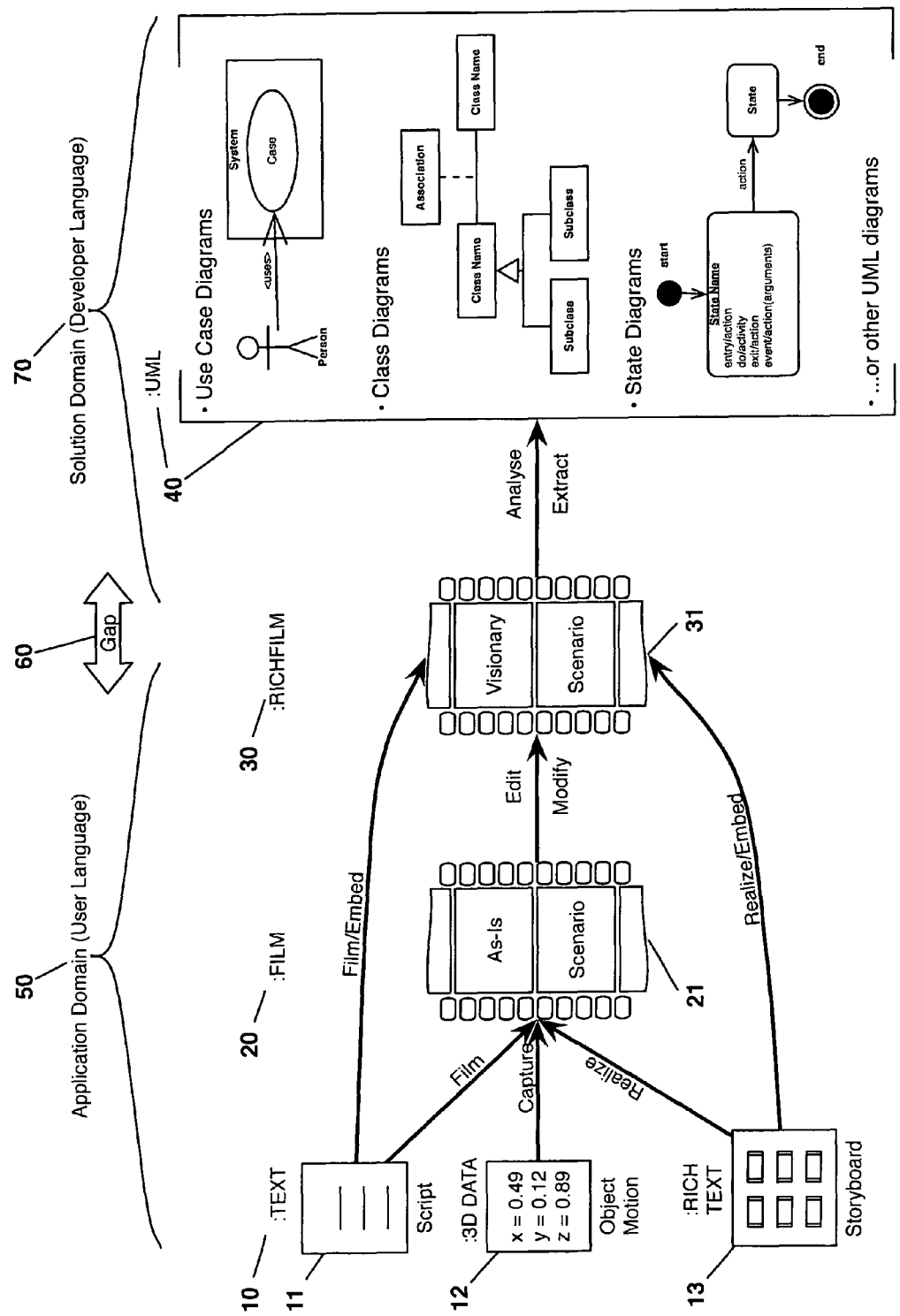
Figure 3:
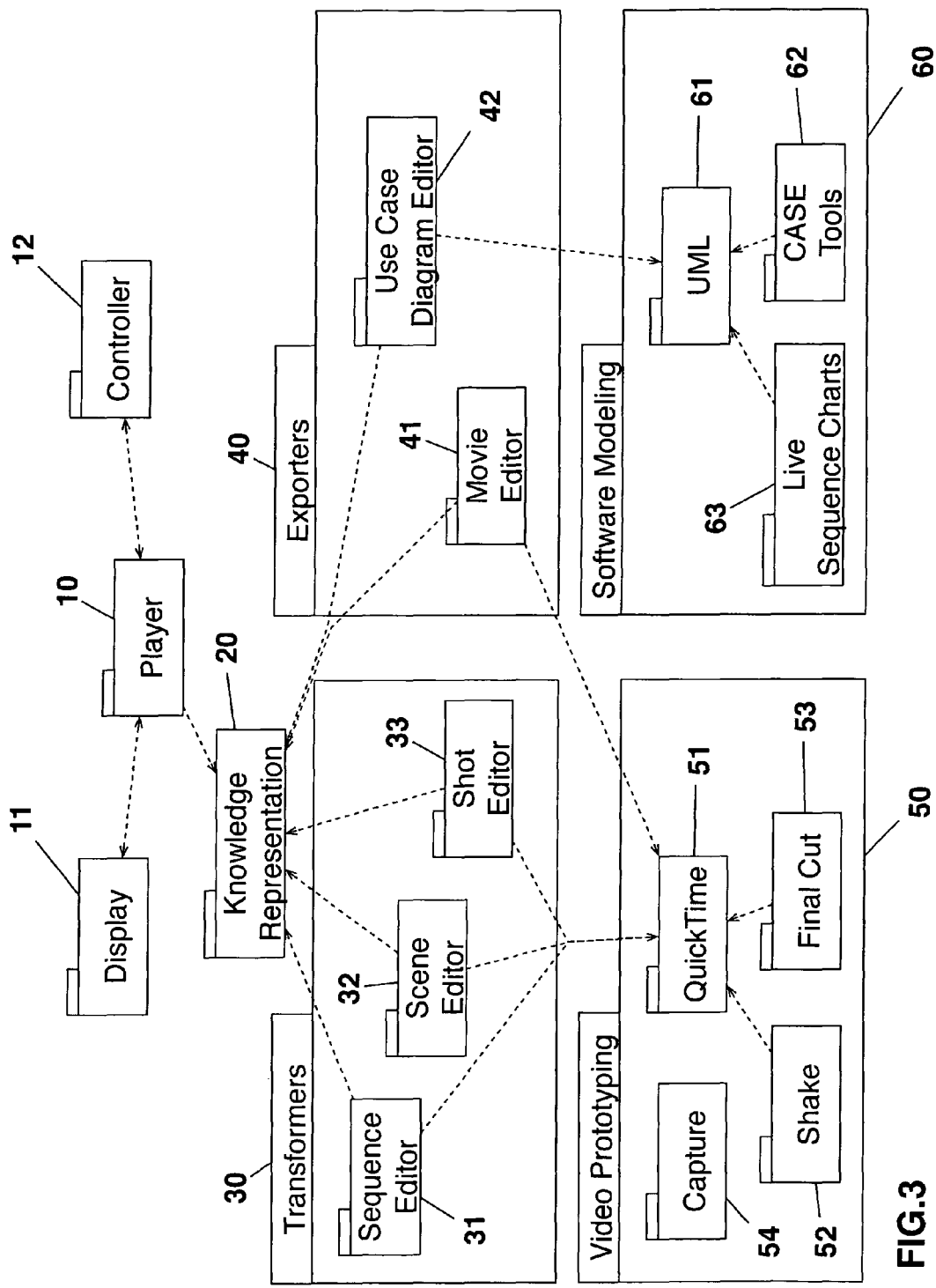
Figure 4:
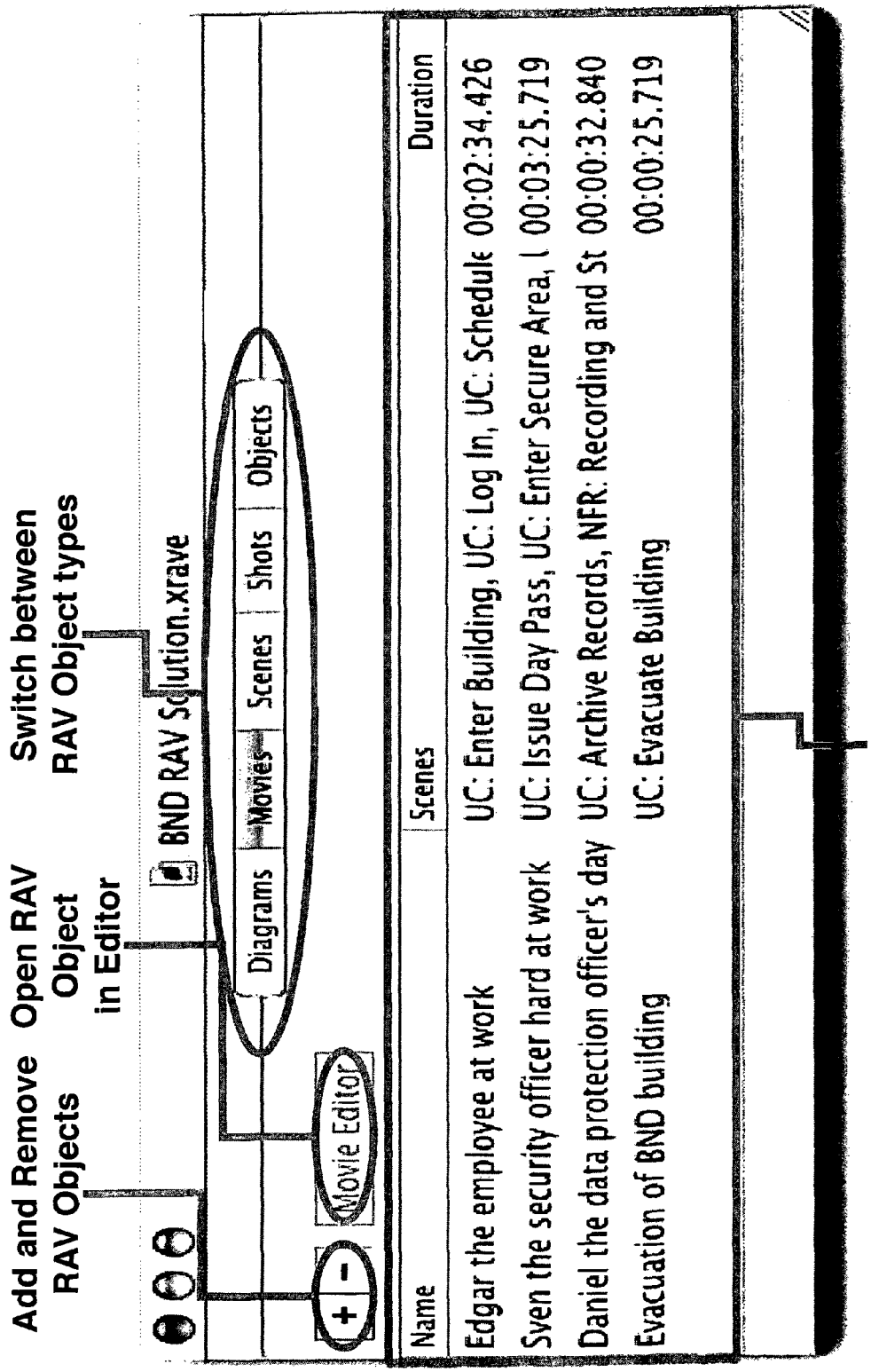
Figure 5:
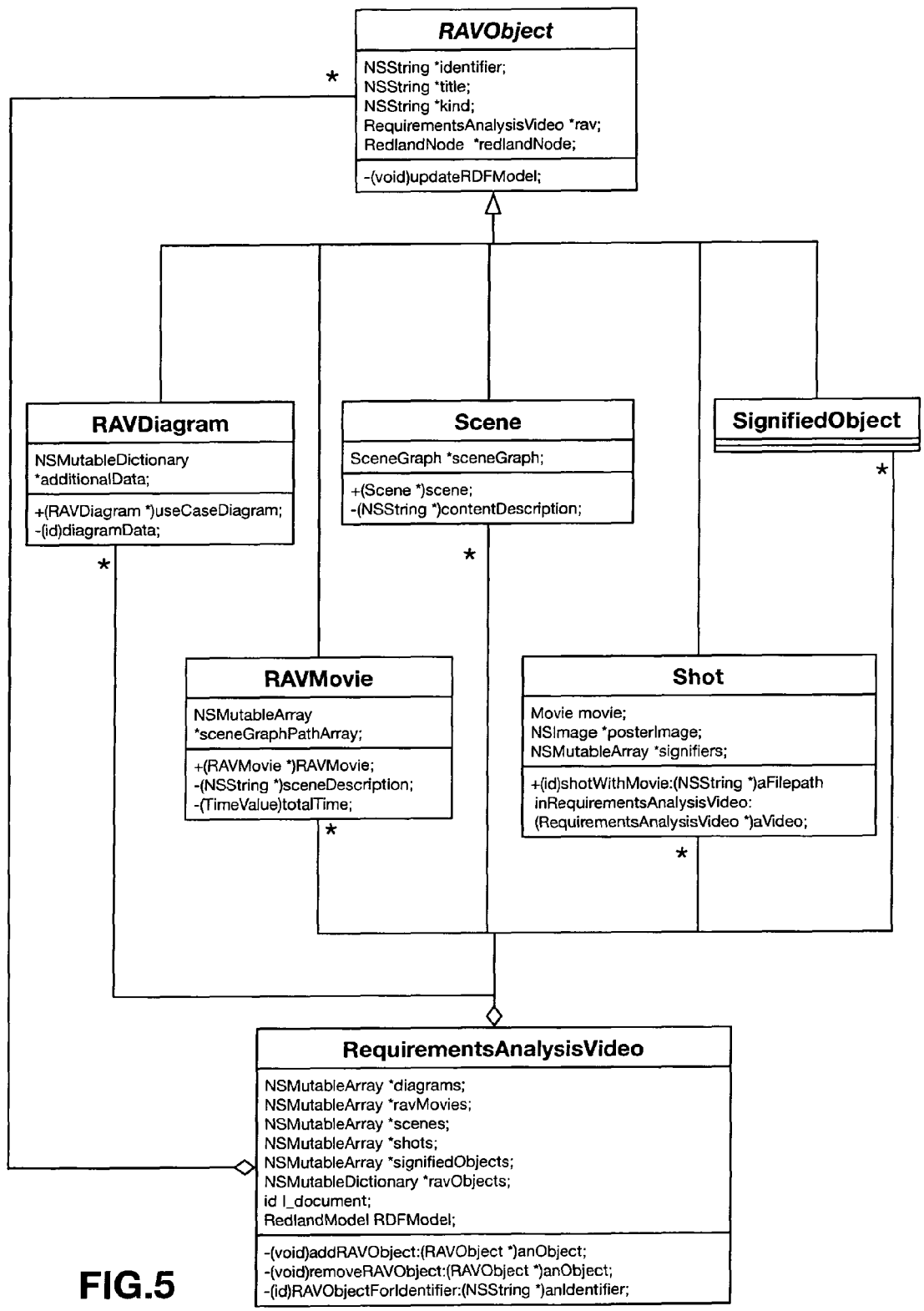
Figure 6:
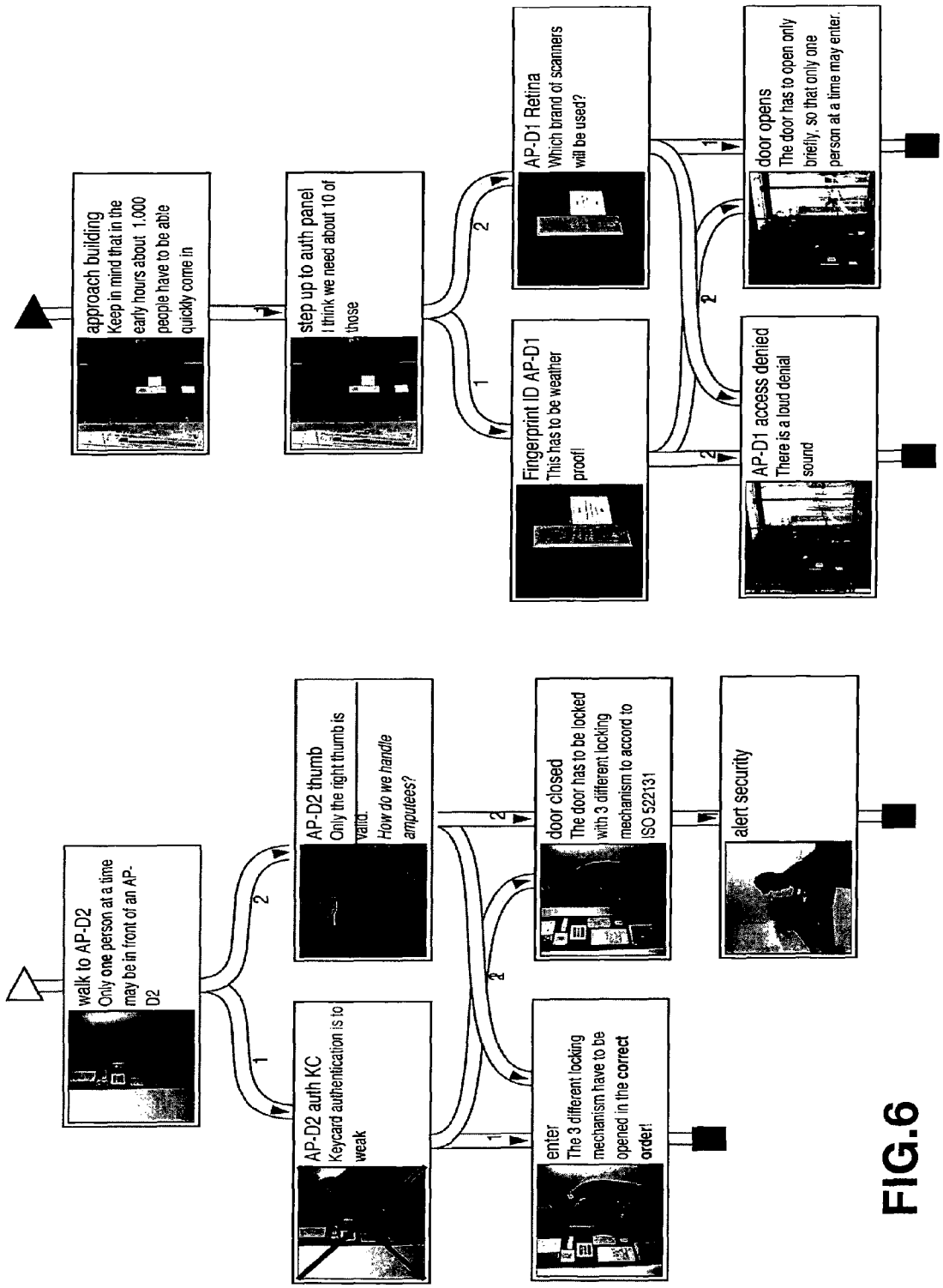
Figure 7:
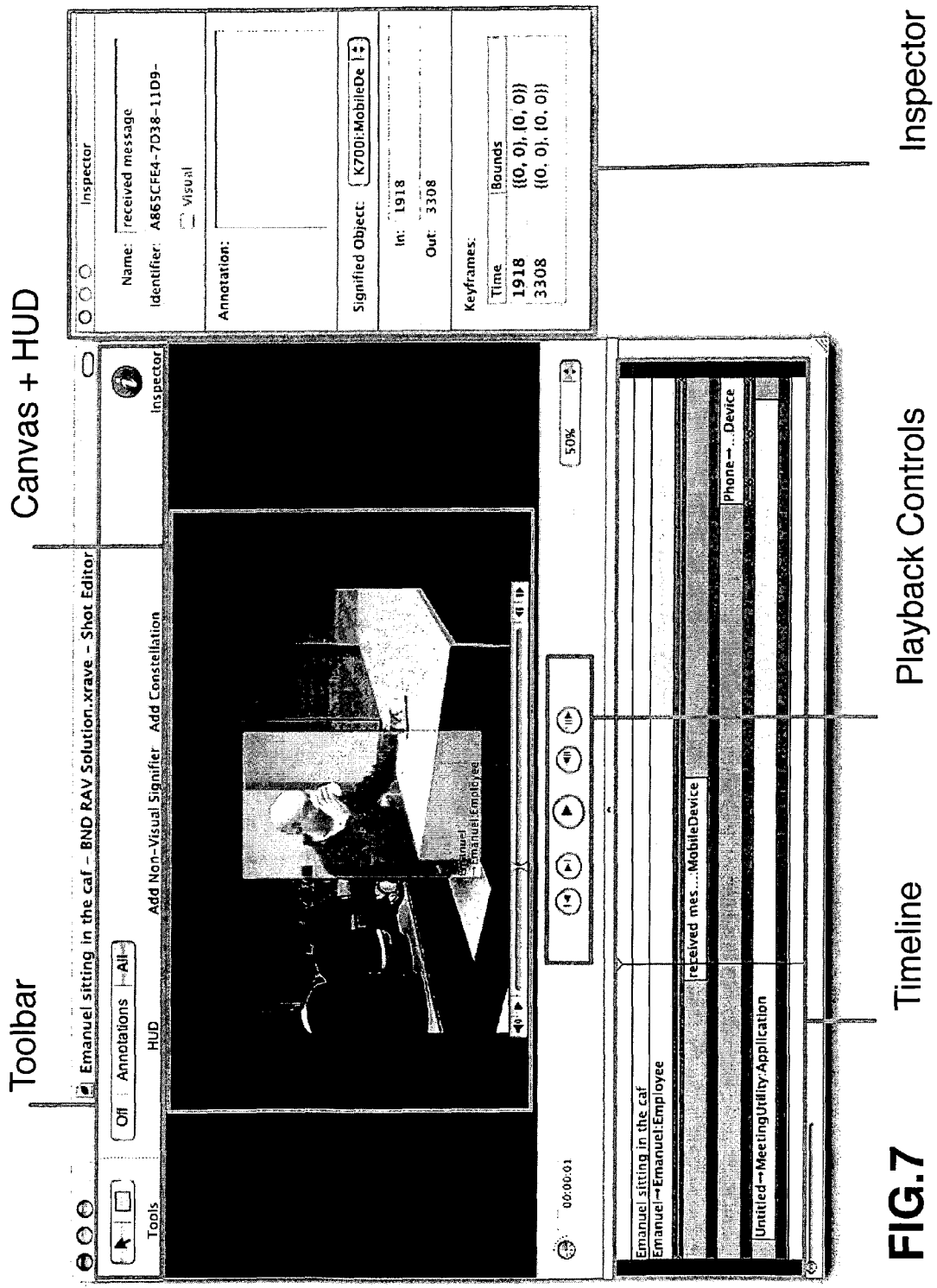
Figure 8:
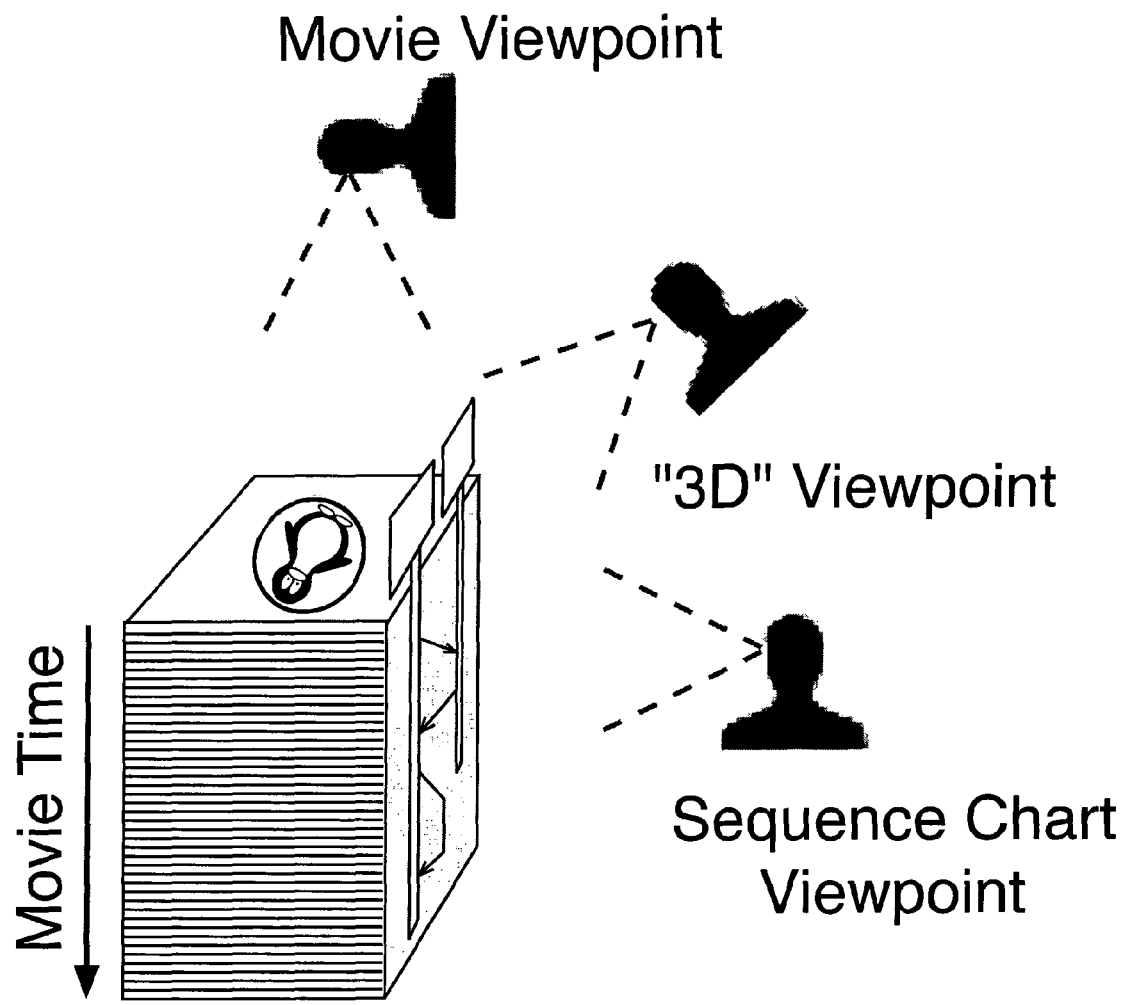
Figure 9:
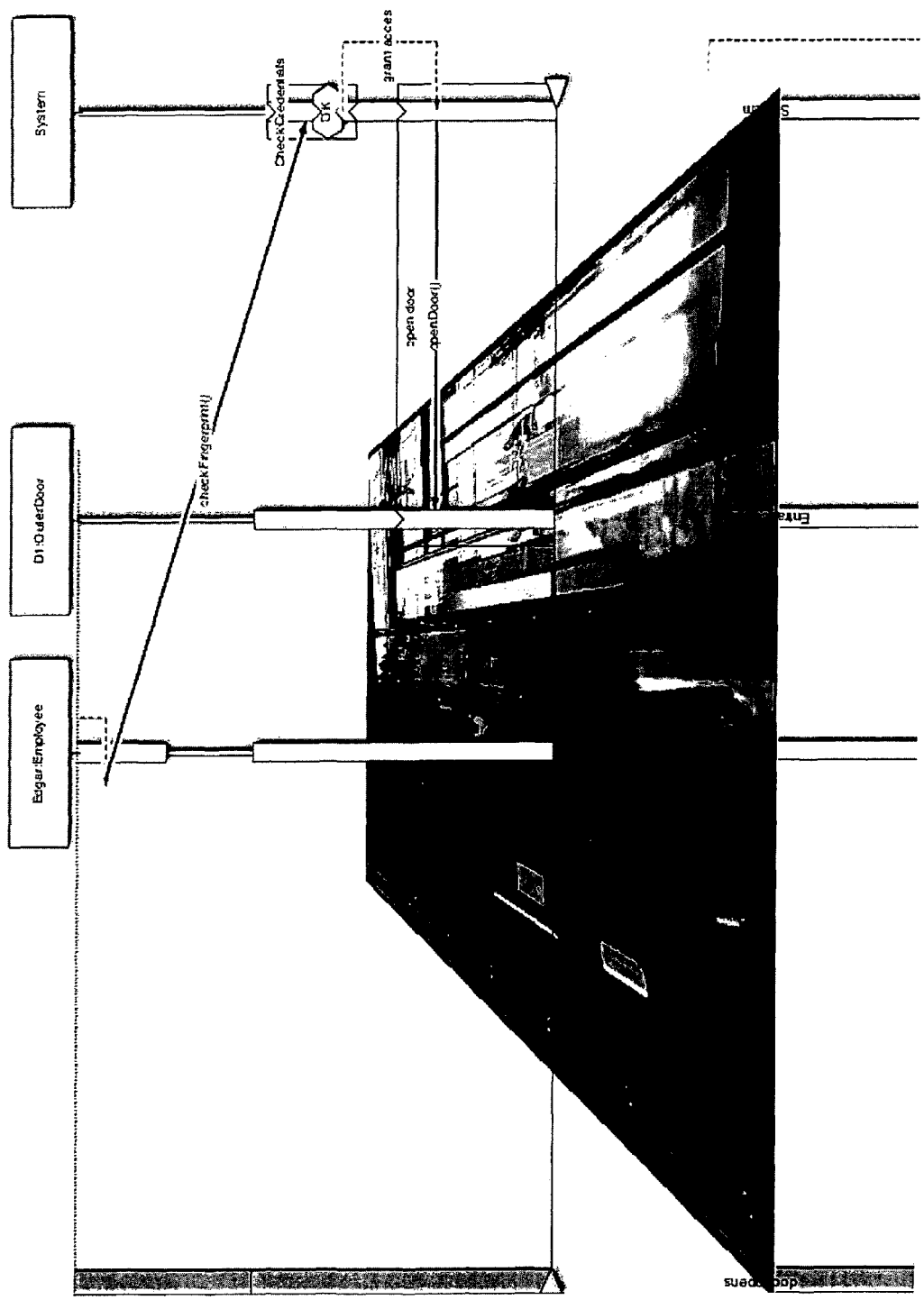
Figure 10:
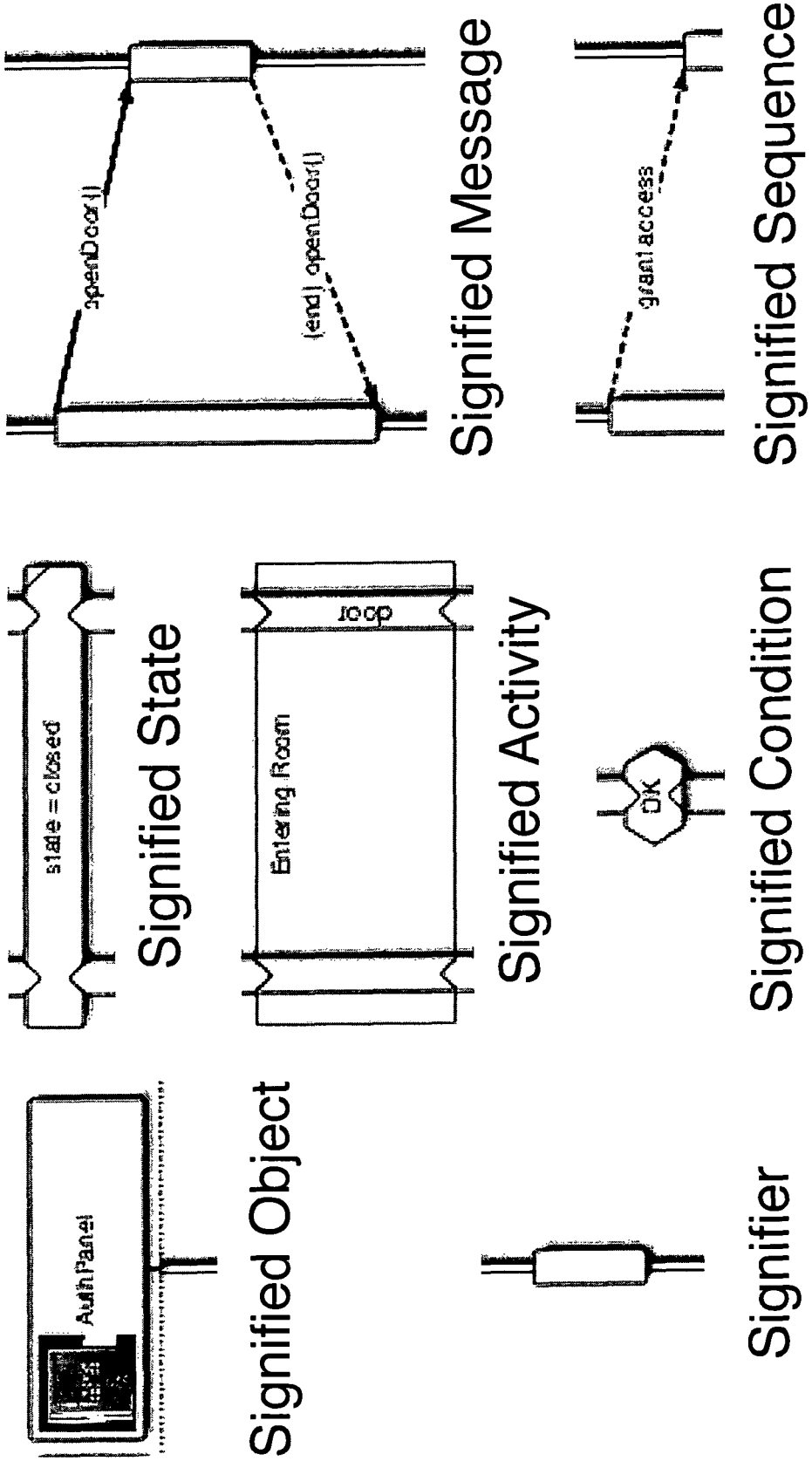
Figure 11:
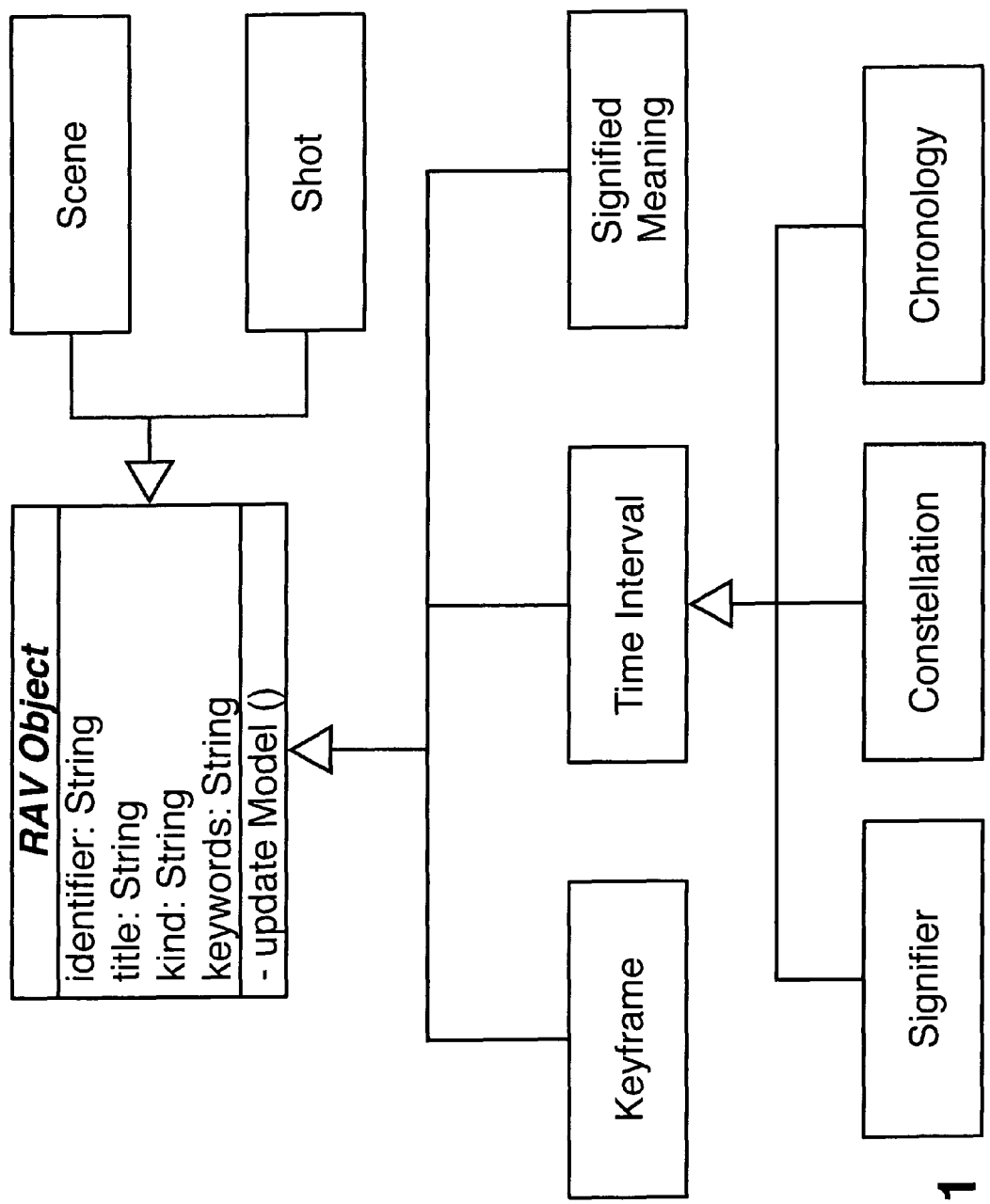
Figure 12:
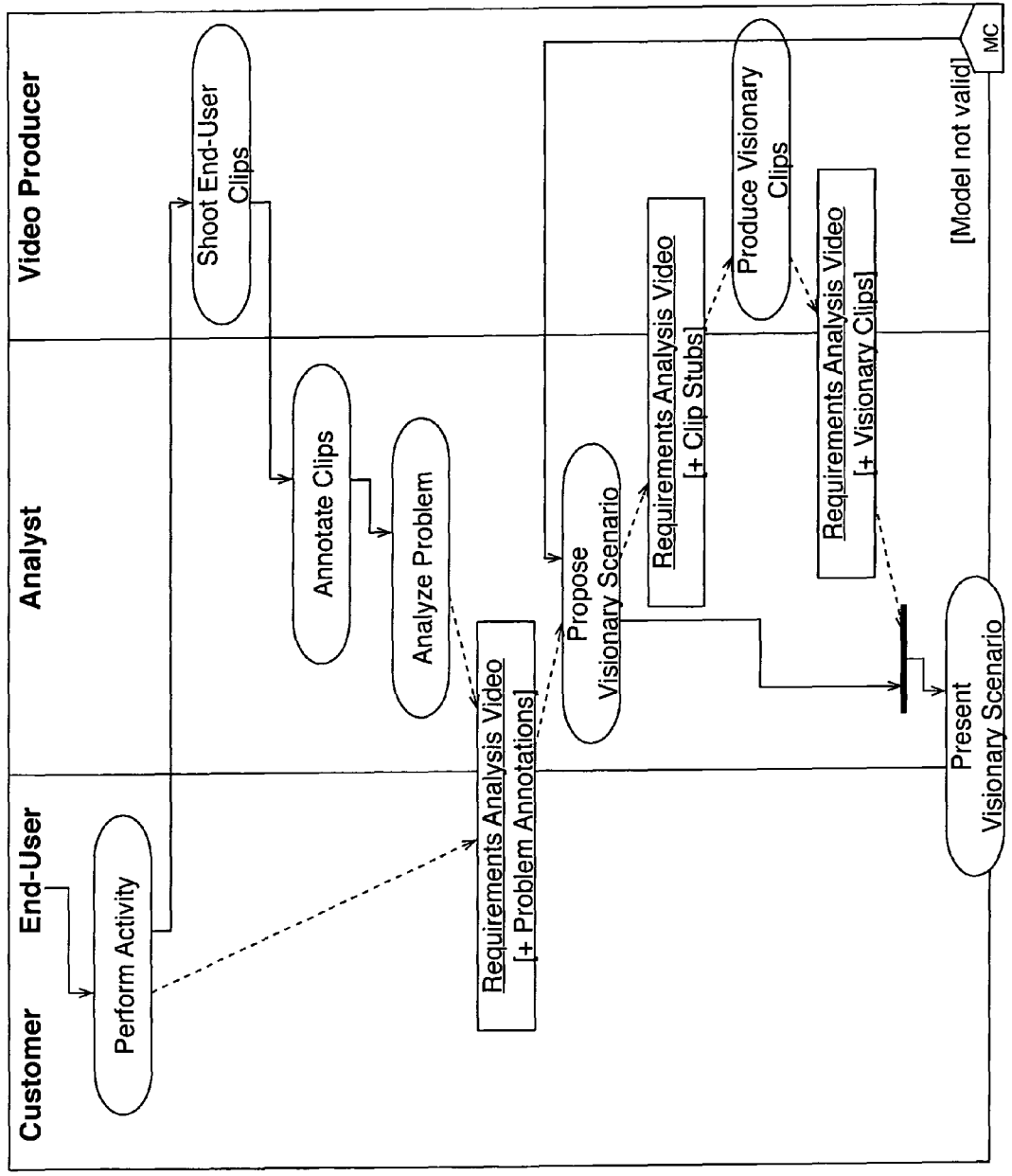
Figure 13:
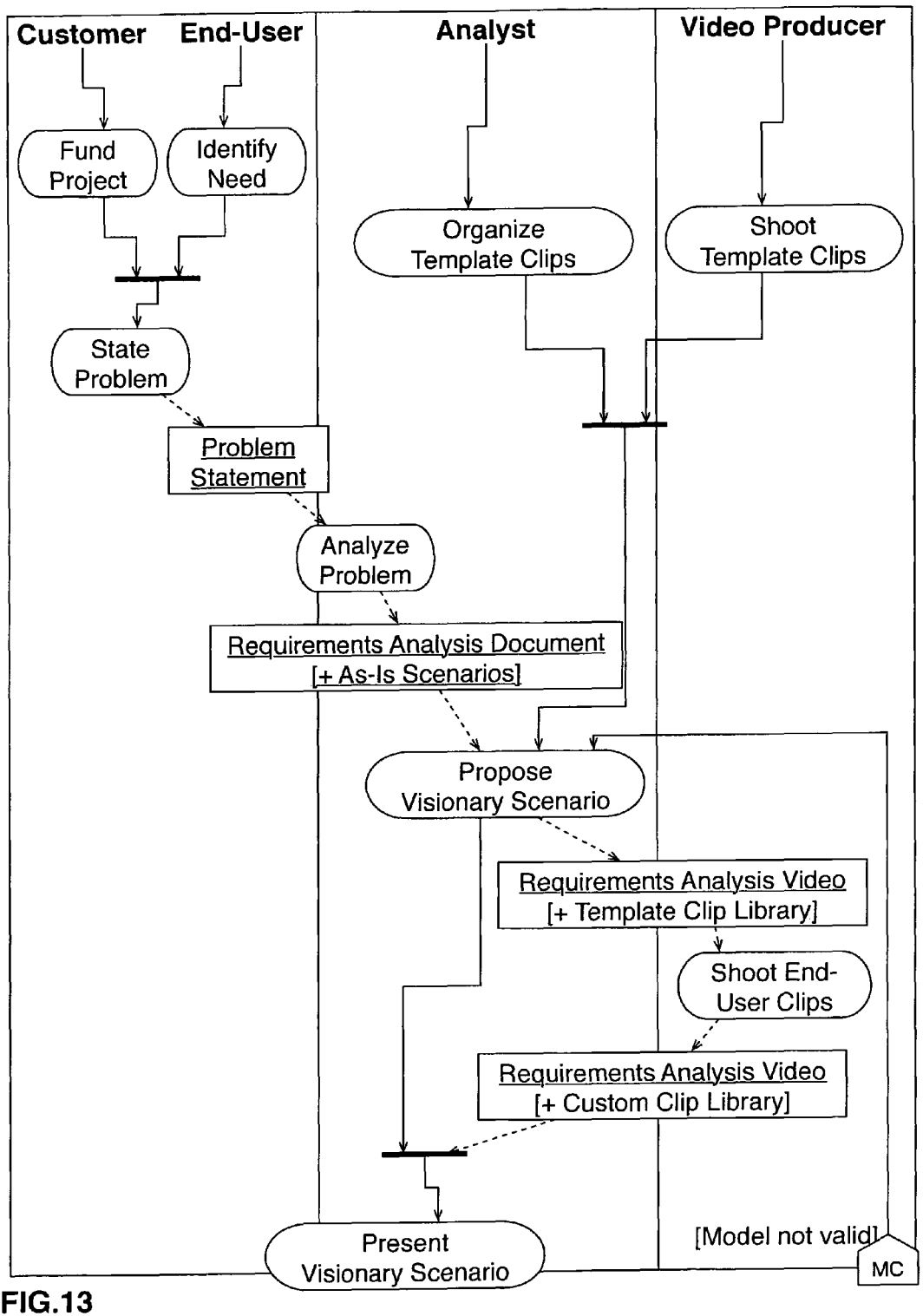
Figure 14:
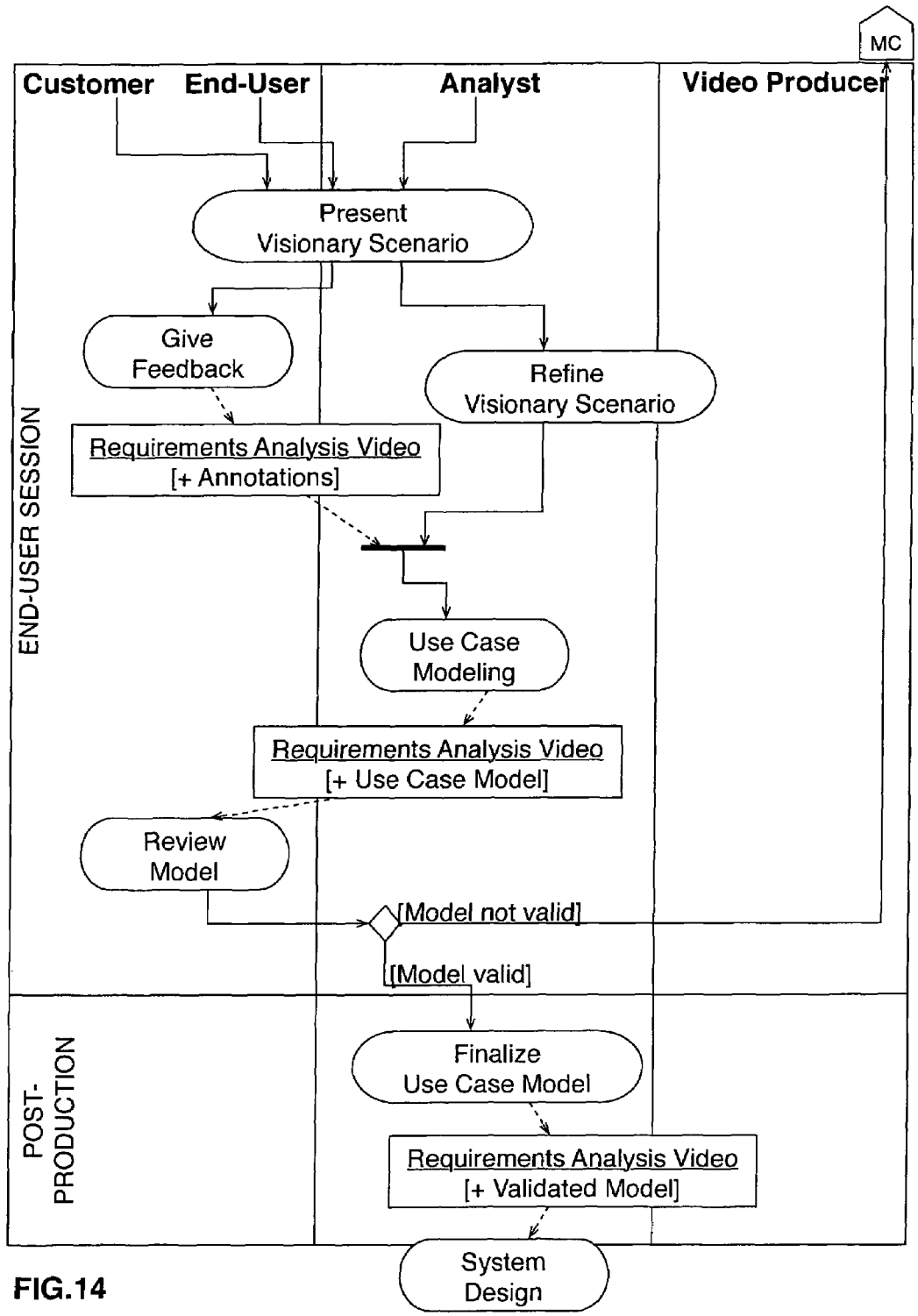

Further features, objects and advantages of the present invention will become apparent from the following detailed description of sample embodiments. Reference is made to the drawings, in which:

FIG. 1 shows a UML class diagram that represents a model of digital video,

FIG. 2 shows a schematic overview of a sample embodiment of the present invention, FIG. 3 shows a UML package diagram that represents the subsystem decomposition of a tool kit according to a sample embodiment of the present invention, FIG. 4 shows a sample screenshot of the main window of an editor in a sample embodiment of the present invention, FIG. 5 shows a UML class diagram that represents some aspects of a sample data structure that is processed by the editor of FIG. 4, FIG. 6 shows a sample screenshot of a sample scene graph that can be processed by the editor of FIG. 4, FIG. 7 shows a sample screenshot of a shot editor according to a sample embodiment of the present invention, FIG. 8 shows a diagram that schematically represents three possible viewpoints provided by a sequence editor according to a sample embodiment of the present invention, FIG. 9 shows a sample screenshot of the 3D viewpoint of the sequence editor according to a sample embodiment of the present invention, FIG. 10 shows several screenshots depicting a number of elements that are available for use in the sequence editor of FIG. 9, FIG. 11 shows a UML class diagram that represents a sample knowledge model structure according to a sample embodiment of the present invention, FIG. 12 shows a UML activity diagram that describes a first embodiment ("re-engineering") of the method of an embodiment of the present invention with respect to pre-production, FIG. 13 shows a UML activity diagram that describes a second embodiment ("greenfield engineering") of the method of an embodiment of the present invention with respect to pre-production, and FIG. 14 shows a UML activity diagram that describes an embodiment of the method of an embodiment of the present invention with respect to end-user session and post-production.

An idealized overview of the Software Cinema technique in some embodiments of the invention is shown in FIG. 2. The proposed technique uses the film medium to create a multi-dimensional description of the visionary scenario as close to the end-user reality as possible. On the left hand side, we see application domain elements expressed in user language 50, for example as text 10, rich text 13 (containing photos or sketches), or even just reality as captured on film or by motion sensors 12.

When expressed in free-form text, we speak of scripts of scenarios 11. Scenarios are used as examples for illustrating common cases. Their focus is on understandability. They are either concerned with what the problems are that the new system should solve (as-is scenarios), or with what the solution could be like (visionary scenarios). Usually, the scenarios 11 are written in theatrical style with real names for the actors and concrete actions taken by them. They can serve as the starting point for actual filming, or as annotation text in a Requirements Analysis Video (RAV) 21.

In many cases, a picture can help clarify a textual description of end-users' desires, problems, or apperceptions. A common application can be found in storyboards 13 that previsualize films long before shooting begins. They are usually created alongside the scripts 11, emphasizing the visual aspects of scenarios. For example, the framing or composition of shots and the relationships between foreground and background are sometimes important stylistic devices for filmmakers. They hire artists who can quickly sketch different ideas and backgrounds to decide on the 'look' of the film before props, costumes, and sets are made. Similarly, location scouts take photos of potential filming locations before decisions are made where to film certain scenes, whether to film in a studio or on-location, or even what the exact plot should be.

The only elements of end-user reality that can be captured are, of course, physical reality themselves. A regular film camera does a satisfactory job at this endeavor, but only within certain limitations. The most striking one is that it flattens reality onto a two-dimensional representation of reality, a picture, which is taken from one single point of view. As soon as this picture is 'in the can'—as the filmmakers say— the only thing you can do with it is watch it. Humans are very forgiving of the fact that motion pictures are two-dimensional, because we are accustomed to viewing this simplification. Depth perception is really only relevant at very close range, so the point of view becomes the most relevant feature of these pictures.

Recently, a fundamentally different kind of 'camera' has become popular and it can already be anticipated how it will also influence the Software Cinema technique. Visual effects intensive shots are composited digitally nowadays, and sometimes the appearance of an actor should be modified entirely. So it became more practical to capture motion data 12 of certain (strategically placed) fulcrum points on the actors instead of filming them with a regular camera. These motion paths are imported into a three-dimensional rendering package and applied to virtual three-dimensional models of actors, sometimes very unlike human shapes. The output of the rendering package can then be used in the compositing directly, without the need for keying out the backgrounds. This process has been perfected in the last few years, even allowing simulated interaction of the virtual actors with real (filmed) surroundings.

When capturing reality on film 20, how visceral the perception of reality is to viewers largely depends on how much they can identify with the actors shown. So it is important to make a point of filming either the future end-users directly or someone who is believably acting as one. The next point is the environment to film them in. Here, too, it is important to choose either the actual future environment of the new system, or an environment sufficiently similar to it. This has two reasons: On the one hand, it should guarantee the ability of end-users to identify with the scenarios and, on the other hand, allow the Software Cinematographer to get a feel for what matters to end-users. As we show in our experiments, potential exceptional states, constraints, or errors in the scenario are more easily noted when the 'model of reality'—the film—is as close to reality as possible.

From a rich information base about the application domain 30, the Software Cinematographer can incrementally produce a visionary scenario 31 of how to amend the life of the end-user. It is important to understand that in cases where the end-user has a markedly different background from developers, the gap 60 between what is considered a 'good solution' can be substantial. This is the gap is bridged with the Software Cinema technique. It is difficult for developers to grasp the mindset and work concepts of the end-user. Especially when building systems for 'blue-collar workers' who have never been exposed to the desktop metaphor of standard Windows/ Icons/Menus/Pointers-based GUIs and whose daily work doesn't include sitting at a desk for even brief periods of time. What appears like a good solution to the Software Cinematographer might not work well at all for the actual end-user. To avoid misunderstandings or misconceptions, the concrete realization of a visionary scenario 31 in film provides a richer base for discussion and simultaneously forces the Software Cinematographer to use building blocks from the application domain—the end-user's reality. Software Cinema is a 'modeling video'-based technique (read as in 'modeling clay') in the sense of making a model out of video artifacts (not clay).

The purpose of some embodiments of the present invention is to generate, modify, and present Requirements Analysis Videos (RAVs). RAVs consist of Unified Modeling Language (UML) diagrams (or extensions thereof) and video footage. In some embodiments of the invention, these two elements can be linked on a fine-grained level of detail to facilitate the validation of software models by end-users, who only need to understand the video.

When talking to end-users, the Software Cinematographer will have to make quick changes and annotate information at the right place. The tool should not get in the way, ideally, it will appear natural to the end-user to point out certain facts about the application domain and watch the Software Cinematographer annotate or change them exactly where he pointed to.

Such alterations of presented video material can be categorized into classes of required modifications. For 'plasticity' of the visionary scenario film, we require a degree of flexibility previously unattained by regular film. Table 1 shows a classification of plasticity for video footage that is used in the Software Cinema technique according to some embodiments of the invention.

TABLE 1

Plasticity Classes of Video for Software Cinema.

| | |
|---|---|
| Class-6 | Switch Point of View |
| Class-5 | Modify Object Interaction |
| Class-4 | Modify Object Position in Time and Space |
| Class-3 | Replace Objects (Change Complex Properites) with Compositing Techniques (shape, size, perspective) |
| Class-2 | Change Basic Object Properties with Video Filters (color, focus, distortion, key) |
| Class-1 | Annotate Objects |
| Class-0 | Set Time-based Markers |

Class-1: First, as the most basic alteration, we need a way of attaching comments to identified objects. This differs from the readily available way of attaching subtitle text or similar markers to certain timestamps. We want to provide 'video anchors' on the objects depicted rather than just on full frames of the video. While there is currently no generic algorithm that allows automatic tracking of arbitrary objects in video, it is still feasible to assume that this can be provided eventually (David Stotts and Jason McColm Smith. Semi-automated hyperlink markup for archived video. In *Proceedings of the 13th ACM conference on Hypertext and Hypermedia (HT '02)*, pages 105-106. ACM Press, June 2002. Available from: http://doi.acm.org/10.1145/513338.513367). More importantly, an exemplary embodiment can work by simply setting keyframes for regions that are interpolated linearity.

Class-2: Second, when objects shown in video are elevated to tangibility, the next class of flexibility is the changing of certain properties of these objects. This might be achieved with standard video editing software that provides video filters. Such software usually allows to define an area of applicability for the effect, thus individual objects could be changed in their basic properties: Color correction could be employed to highlight objects, focus and blur effects might draw attention to specific details. Specialized distortion effects as well as keying filters might be used for Software Cinema in exceptional circumstances, but will most probably be too inflexible for making desired changes to the video. This is left to the next class of plasticity.

Class-3: Third, when individual objects need to be replaced or several, compound properties need to be changed. The practical solution is to employ compositing software rather than to just modify one single stream of video. In this scenario, the video that is shown to the end-user already consists of individual video playfields that are merged by the compositor. The standard metaphor that compositing software offers is that of individual, transparent layers that are stacked in front of one background plate. The final composition can, of course, combine real (filmed) surroundings and actors with virtual (computer-generated) images. In embodiments, this generative approach to film is preferred, keeping the layering information intact. This embodiment eliminates the need for tracking objects in video, as the objects already have a defined playfield and alpha-channel, making it simple to provide the facilities of lower plasticity classes.

Class-4: Fourth, where some embodiments of the present invention surpass current video editing software, the Software Cinematographer will need to modify the timing and placement of objects in the depicted film reality. For this, we will have to leave the path of standard video production and rather take an animator's perspective. Before fully rendered and shaded versions of totally animated films (as opposed to those rich with visual effects) are produced, animators test simplified versions, for example consisting of just wireframes, to see what works to tell the story. Similarly, in preferred embodiments, Software Cinematographers have tools of this flexibility at their disposal. But for now, the believability of such totally animated movies is still restricted to unrealistic domains of fairy tales, fantasy or science fiction. The important point of Software Cinema to base the discussion in the end-user's reality would thus be missed when employing current animation technology.

Class-5: Fifth, films are motion pictures, that show complex interactions in real-time. The next class of plasticity calls for changing these interactions as semantic units. For example, an actor opening a door is a simple interaction that the viewer barely notices consciously. When filmed and digitized, it becomes a choreographed stream of pixels in digital video. But this complex 'pixel dance' still means the opening of a door, only that the physical medium has no conception of this simple fact. The Software Cinematographer, however, might want to change it to an automatic door, or even eliminate the door and just show the actor walking through a gate. Consider another example of an intelligent car that drives past a hotspot providing contextual information for the driver. The length of the interaction between hotspot and car could be something that needs adjustment.

One approach of exemplary embodiments films several alternatives for the same kind of interaction and makes them available simultaneously. When talking to the end-users, the Software Cinematographer can show and discuss theses alternatives to elicit more details about the application domain and to generate more ideas for the solution domain. To aid the Software Cinematographer command this wealth of alternatives alongside the temporal order of the shots that a scenario requires, some embodiments of the present invention provide a means for categorization and sequencing of shots.

Class-6: Sixth and last, the ultimate plasticity of video requires a full three-dimensional model of the reality shown which needs to be shown in real-time. This immersive simulation of a visionary scenario would expose the most flexibility for changing anything and watching from any perspective. But arbitrary changes of the point of view are probably not extremely important when a handful of good options that are predefined can be chosen.

Clips that are produced for reuse, sometimes referred to as 'video components' or 'template clips', should exhibit easy 'tropeability':

"Generally, in literary criticism the term 'trope' is used to mean 'figure of speech': that is, a 'turn' of phrase in which language is bent so that it reveals more than literal meanings. The concepts of code and sign describe the elements of the 'language' of an art; the concept of trope is necessary to describe the often very unusual and illogical way those codes and signs are used to produce new, unexpected meanings. We are concerned now with the active aspect of art. 'Trope,' from the Greek tropos (via Latin tropus) originally meant 'turn,' 'way,' or 'manner,' so even etymologically the word suggests an activity rather than a static definition." (James Monaco. *How to Read a Film: The World of Movies, Media, and Multimedia: Art, Technology, Language, History, Theory*. Oxford University Press, New York, 3rd book & DVD edition, March 2000)

This is precisely why we had to add the -ability suffix to the noun trope. It is not statically or generally defined, but the act of reusing a video component in another context is what we intend. What humans can perceive in a short video clip is basically two things: images and sounds. Depending on the shot variables, the perceptability will vary. This is what we exploit for some embodiments of the present invention: A short clip, showing, for example, just a hand that touches a button, can be taken out of context without it being disturbing to the flow of represented events. So in some embodiments of the invention, a clip that has been fully qualified with its contained signifiers just on the right level of detail may be useful in a totally different scenario.

We believe that only a few of these template clips are required for every application domain. An innovative application exhibits predefined interaction styles, so a reusable clip would only show a close-up of a hand doing something simple, like pressing a button. This identical clip could always be used to signify the pressing of a button, no matter what the system is. In the long run, we envision that Software Cinematographers will produce, annotate, and share their template clips, just as software components are shared today. When a project is large, a semi-professional video production company might be hired. They will have two tasks: On the one hand, they provide the initial clip library, showing the end-user in typical situations of his everyday work. On the other hand, they have to produce a wealth of short clips, showing interaction of the end-user with the envisioned system.

For Software Cinematographers to be able to create good template clips, it must be possible to explain the clip contents in an abstract way. From this description, some embodiments of the present invention build a knowledge representation of what the clips show and signify. This meta-data format can be used for searching appropriate clips or specifying what precisely needs to be shot. We build on the Resource Description Framework (RDF) for our knowledge representation, which provides maintainability of our meta-data as well as standard search functionality.

In semiotics a sign is seen as a composition of the signifier which carries the meaning and the signified concept or thing. Spectators cannot access the signified meanings directly. In fact, they have to mentally transform and abstract the things they see and hear in order to grasp their meaning. This is, of course, not a unique property of film and has to be done for understanding any kind of representation, such as reading a book. The process of mental transformation and abstraction is the decoding of the signifier into its signified meaning. The other way around, a signified meaning is encoded into a signifier.

In film signifier and signified are almost identical because of its directness (a picture of a book is much closer to the concept of a book than the written word 'book'). Nevertheless, there are various ways to encode such meanings in film.

There is already a classic way of changing and discussing signs on a less technological level: Based on the work of Charles Sanders Peirce (1839-1914), three modes of signs are commonly used in semiotics for defining the reference of a signifier s to its meaning s'. These modes are distinguished by the straightness of the reference:

Icon (s=s'): a signifier s resembles the signified s'. Portraits or realistic sound effects would be examples for the iconic mode.

Index (s≈s'): a signifier s which is directly connected in some way (existentially or causally) to the signified s'. Smoke signifying fire, or a thermometer standing for the temperature, are examples for an indexical mode.

Symbol (s≡s'): a signifier s which does not resemble the signified s' but which is 'arbitrary' or purely conventional. A red traffic light denoting to stop or a red rose as a symbol for love are examples for the symbolic mode.

For traceability of the encoding of a signified meaning s' into a signifier s it is useful to define two additional variants of index and symbol:

Synecdoche (s<s' or s>s'): a figure in which a part s signifies the whole s' or vice versa. For example, a motor is understood to be an automobile.

Trope (s=s'): a twist or turn in the meaning s' signified by the signifier s. Some important types of trope are: antonyms, irony, and metaphors.

Each signifier, whether visible or not, encodes a certain signified meaning. Such signified meanings are, at first hand, abstract concepts. The example of a 'policeman' who depicts 'the law' is a symbolic sign consisting of a visual signifier 'policeman' and a signified (abstract) concept of 'the law.'

However, such abstract concepts are nevertheless concretely defined by the nature of film. Strictly speaking, the 'policeman' can never depict the metaphysical idea of 'the law' in all its facets. He will, however, represent an instance of such an idea, for example 'modern american law,' in any given movie. This is what we then call an abstract class. This distinction between abstract classes and classes is important for us. Our definition of signified meaning is 'an abstract but concretely defined concept of interest.'

Of course, not all signifiers depict abstract classes. The same 'policeman' could also be encoded as an icon (then he simply depicts a policeman) or even stand for a certain police station (the encoding mode would then be a synecdoche). In both cases, the signified meaning denotes a material object that we call a signified object.

Because signified objects signify material objects, they are located somewhere in the narrative space—a three-dimensional world in which the movie plays. Similar to the spatial relationships $R\zeta$ described in section 2.3.1 the spatial arrangement can be expressed as relationships between signified objects. But in contrast to the two-dimensional relationships between currently visible signifiers, the arrangement of signified objects happens within the three-dimensional narrative space, regardless of visibility of the signified object. We omit the verbose description of a necessary $R'\zeta$ for brevity.

TABLE 2

| The Signified Meanings s' | | | |
|---|---|---|---|
| Encoding | Signifier | Constellation | Chronology |
| Icon<br>s = s' | Object | State<br>Topology | Sequence |
| Index<br>s ≈ s' | State | Activity<br>State | Sequence<br>Message |
| Symbol<br>s ≡ s' | Concept | Condition<br>Relationship | Assignment |
| Synecdoche<br>s < s' or s > s' | Object<br>(s < s') | Concept<br>(s > s') | Synchronization<br>Threading |
| Trope<br>s = s' | Alternative<br>Solution | Anti-<br>Scenario | Concurrency<br>Parallelism |

Table 2 shows how encodings of syntactic units s stand for signified meanings s'. It is not meant as an exclusive mapping of signifiers and signified meanings, but only as an exemplary and rather straight-forward description of film semantics. Filmmakers have more conceivable options of using filmic expression, but for Software Cinema, we restricted the signified meanings to those shown here. It is an extensible structure of semiotic encodings which fulfills the mapping of a language of film to software models.

In the following, we will describe the semantic units of the language of film as we defined it in the context of Software Cinema in some embodiments of the invention. They are the units that can be partially mapped to static and dynamic software models as defined in literature. When a direct forward mapping from film to software can be found, it is specifically described. Table 2 categorizes these signified meanings by their signifying syntactic unit and a possible semiotic encoding.

A Concept is a sign for a concretely defined concept of interest in a movie. An example could be the 'end-user,' an 'input device,' or an 'algorithm.' Concepts directly map to classes in software. If the concept is abstract, such as a type or a collection of similar properties, also abstract classes can be signified. For simplicity of the film model, multiple inheritance can be used: The concept of a 'randomizer' and the concept of a 'list of favorites' can both be inherited by a signified music player. This does not necessarily mean that the software model has to exhibit the same inheritance structure, only that the application domain can be seen this way.

An Object is a signified object of any kind. This can be a 'policeman' or a 'rose,' and is thus a material thing that is contained in the narration of the movie. Not all objects have an associated and explicitly modeled concept that they inherit from. Just by appearing in the movie, objects are 'instantiated' for the narration. Only those objects that are relevant, i.e. referenced by any relation, are modeled. They can be directly mapped to actors or software objects in most cases.

A State is internal to objects. It can range from simple properties, such as temperature, color, or weight, to complex states, such as 'is open,' 'is turned on,' or 'is working.' They can be modeled as an indexical signifier, as this is the most classical use of this encoding. They can also be modeled as unary constellations of only one signifier, if for example, the targeted signifier has this state only for a certain period of time. Then the constellation itself, containing only the single signifier, can encode the state of the signifier and thereby define its duration independently of the signifier.

An Activity is related to at least two signs in the movie. It involves an operation that takes time. As a large variety of constellations are purely coincidental, encoding a specified name of an activity that signifiers take part in, allows attaching operational meaning to a specific constellation. For example, a person operating a mobile phone could be dialling a number to make a call, entering a text message, or searching for information on the internet. If the screen of the mobile phone is obscured, the same constellation can encode all of these activities. Imagine a PDA in the person's other hand is also visible, this could be part of the activity, such as the person looking up a number to dial, or not. Encoded activities are therefore always attached to minimal constellations, only the relevant signs are part of it.

A Relationship is one of three kinds. More than one can exist between two signs:

Topological relationships describe arrangements related to the structure of complex objects. This arrangement type does not only describe the spatial arrangement of signified objects but also marks one to be in a semantic relationship to another object. The hand, in our example, becomes the hand of 'Bob' and not that of 'Data' by an 'inside' arrangement of the signified hand and the signified character. By signifying certain topologies, the film is able to express the static structures of the application domain. Such relationships can often be directly mapped to software models of containment or composition.

Directional relationships describe if signs have a relevant orientation towards each other. An example would be an antenna that always needs to be oriented upwards. The vocabulary of signified directional relationships need to be an expanded $R'\zeta\_dir$, adding the three-dimensional positional directions of 'above' and 'below' to $R\zeta\_dir$. We did not explicitly write down all permutations due to their trivial nature and resource constraints.

Distancing relationships describe if elements are supposed to have a specified distance. This is defined either in qualitative terms or in exact measurements. As with signifiers, also relationships are only added to the model if they carry a certain importance to the application domain.

A Condition describes a plot point. It defines a certain constellation to be a cause for a consequential state and temporally following events. For example, if a mobile device needs to be activated before it can sound a notification, a condition can be signified that means that a certain state is caused by the signifying constellation. The expressions used to name conditions can be statements of boolean algebra, if a more complex signified meaning needs to be expressed. But usually, a simple verification if a certain state is true, such as 'door is open,' is sufficient. A condition can be directly mapped to the software model, it usually becomes a conditional block, in an if-then-else construct.

An Assignment changes a state. When a chronology symbolizes that a state has changed, i.e. a sign has a certain state from now on, this can be seen as an assignment of state. It differs from simply setting a state in that the assignment adds the temporal characteristic that the state might have been different before. It is possibly internal to one single object that spontaneously changes its state without external influence. An assignment can be directly mapped to the software model, it will be modeled as setting a property of an object.

A Message describes a flow of information. It is a chronology that connects a sign with a condition, thereby defining that a sign causes the following state of a sign. This signifies that a sign communicates with another sign, usually in a request/response style. When modeling a message, the transported information can either be just a notification of an event, or it can contain more data. In either case, the sign from which the message originates may retain the return in its own state. For software, this is a direct mapping to a message passed between two objects.

A Sequence describes the order of events. It defines which temporal conjunction holds between two messages. The signified sequence can be used to constrain timing requirements on a detailed level. By sequencing two messages, for example, it can be stated that an information exchange has to happen before another message can be sent. It is the simplest form of temporal meaning that a film can convey, and it maps directly to the software model as an imposed ordering of events in the system.

Synchronization defines that a chronology has to happen in a certain temporal conjunction. The related time intervals are shown in a specific temporal relation, but only the modeled temporal conjunction is the relevant synchronization. If, for example, two time intervals are shown with a delay of thirty seconds, and the Software Cinematographer decides to shorten this delay to only ten seconds, this shall become a synchronization requirement for a future iteration of the film. Depending on the technical capabilities of the employed tools, the film might also be modified instantly. In effect, modeling synchronization with the temporal conjunctions $R\tau$ allows complete control of what should happen, even if the film does not directly show it. There are three special cases of synchronization requirements: Threading is the explicit permitting of the events to be in no particular order. This meaning can also be attached to any chronology, and can be seen as the default meaning if no other temporal meanings are attached. Concurrency also relates to timing of depicted events. But it specifies necessary overlaps or simultaneous narration. There are several filmic techniques that express this meaning, but an elaboration of these techniques would go beyond the scope of this dissertation. Parallelism defines the related time intervals to occur simultaneously. It is an extreme form of concurrency that requires a series of events to expose identical temporal behavior. This signified meaning can be useful when expressing parallel processing of events, the filmic realization is strongly dependent on the subject matter at hand.

An Alternative Solution is a 'stand-in' for a yet-to-be-specified signifier. If, for example, the situation calls for a hand-held device that should not be like a cell phone, but different in an important respect, this signified meaning can be expressed using the trope encoding and actually showing a cell phone. Modeling this can be useful for narrowing down which elements of the target environment should be replaced, effectively defining the solution space in more detail.

An Anti-Scenario defines forbidden constellations. If we see a cell phone held by a hand, but it should signify that holding it in hand in the particular shot context should never occur, then the trope encoding allows to specify exactly this circumstance.

The following generative grammar formally defines a syntax of film to be used for Software Cinema. Its terminals are English expressions that the film is meant to reveal about the application domain or the visionary solution. Uppercase words need to be replaced by the Software Cinematographer in agreement with potential end-users or other stakeholders and are dependent on the application domain. The grammar is defined mainly for illustrative purposes, many extensions are conceivable for more elaborate requirements specifications, but we decided to keep it to a manageable size that was still able to express the relatively primitive examples that we could think of.

First, the syntactic primitives declare the basic structure imposed on video. A timecode is relative to a media timescale, and can be used to specify an in-point or an out-point. The perceptible is what can be marked in an audio or video track.

```
<timecode>     ::= 'hh:mm:ss:ff'
<in-point>     ::= <timecode>
<out-point>    ::= <timecode>
<perceptible>  ::= 'AUDIO-REGION' | 'FRAME-REGION'
```

Second, the time-interval model of filmic narration is defined, and the basic signifier is defined as a perceptible during—or '@' in its literal meaning 'at'—a time interval. Constellations and chronologies combine signifiers in meaningful ways, using basic conjunctions. We use meta symbols { and } for repetitive items that may appear zero or more times. This way, a constellation may also relate to only one signifier and still carry a meaning.

```
<time-interval>  ::= 'from' <in-point> 'to' <out-point>
<signifier>      ::= <perceptible> '@' <time-interval>
<constellation>  ::= <signifier> { <topological> <signifier> }
                   | <signifier> { <directional> <signifier> }
                   | <signifier> { <distancing> <signifier> }
<chronology>     ::= <signifier> <temporal> <signifier>
                   | <signifier> <temporal> <constellation>
                   | <constellation> <temporal> <signifier>
                   | <constellation> <temporal> <constellation>
```

The sign is the center of the film grammar. Here we define every syntactic unit in combination with a semiotic encoding to be a sign. In the words of the grammar, the syntactic unit is interpreted 'as' a specific encoding. The encodings are defined in the following section.

```
<sign>  ::= <signifier> 'as' <encoding>
          | <constellation> 'as' <encoding>
          | <chronology> 'as' <encoding>
```

The encodings allow to deduce the transported meaning from the syntactic structure of the film. We use five encodings.

```
<encoding>    ::= <icon> | <index> | <symbol> | <synechdoche> | <trope>
<icon>        ::= 'for OBJECT-NAME'
                | 'for' <topology>
                | 'for' <state>
                | 'for' <sequence>
<index>       ::= 'for ACTIVITY-NAME'
                | 'for MESSAGE-NAME'
                | 'for' <state>
                | 'for' <sequence>
<symbol>      ::= 'for CONCEPT-NAME'
                | 'for' <condition>
                | 'for' <relationship>
                | 'for' <assignment>
<synechdoche> ::= 'for OBJECT-NAME'
                | 'for CONCEPT-NAME'
<trope>       ::= 'for SYNCHRONIZATION as shown'
                | 'for THREADING as shown'
                | 'for ALTERNATIVE-SOLUTION-NAME'
                | 'for forbidden ANTI-SCENARIO-NAME'
                | 'for CONCURRENCY as shown'
                | 'for PARALLELISM as shown'
```

The semantic units allow to look at the grammar from the narrative side. They are included here to illustrate the relationships also shown in Table 2.

```
<signified>      ::= <object> | <concept>
<constellation'> ::= <state> | <condition>
                   | <activity> | <topology> | <relationship>
<chronology'>    ::= <assignment> | <sequence> | <message>
```

Signified objects and concepts are specific to the application domain. Therefore, this grammar can only define them to be named literals. Finding good names is an important step in requirements elicitation. In Software Cinema, however, these names are adorned by their filmic representations. A tool kit for Software Cinema can aid the Software Cinematographer to avoid 'Thesaurus' problems of synonyms and homonyms by offering a visual perspective on the application domain.

```
<object>   ::= 'OBJECT-NAME'
<concept>  ::= 'CONCEPT-NAME'
```

Unary Constellations can signify states or conditions, as they relate to only one sign.

```
<state>      ::= <sign> 'is STATE-NAME'
<condition>  ::= 'causes' <state>
```

Binary Constellations relate two signs. It is conceivable to extend the grammar to include more detailed formalisms for n-ary constellations, too. For clarity of presentation, however, we decided to leave this out, without restricting generality of the invention disclosure. Currently, binary constellations can signify activities and relationships. As the topological relationship is particularly important for the static model of the application domain, we singled out this relationship in its own production rule.

```
<activity>      ::= <sign> 'does OPERATION-NAME with' <sign>
<topology>      ::= <sign> <topological> <sign>
<relationship>  ::= <topology>
                  | <sign> <directional> <sign>
                  | <sign> <distancing> <sign>
```

Chronologies signify assignments, messages, or sequences. As the assignment can theoretically relate to only one single signifier, it is the simplest form of signified chronology. It means, that a state is true from now on, a minute difference from simply saying that a sign is in a certain state, as it adds the temporal aspect. A message signifies that one sign causes a certain state. In other words, it may either be a recursive instruction of one single sign, or it may also cause one sign to 'talk to' another sign. Last, the signified sequence allows the temporal ordering of messages. Also for sequences, we can conceive of many more formalisms of signified ordering, but a full exploration of the useful permutations with temporal conjunctions is left to the users of the invention.

```
<assignment>   ::= <state> 'from now on'
<message>      ::= <sign> <condition>
<sequence>     ::= <message> <temporal> <message>
```

Conjunctions are used to connect various clauses in the specified grammar and have already been used above. They are categorized in temporal relationships Rτ and spatial relationships Rζ. The δ parameters allow the specification of exact temporal or spatial distances.

```
<conjunction>  ::= <temporal> | <topological> | <directional> |
                   <distancing>
<temporal>     ::= 'before(δ1)'
                 | 'cobegin(δ1)'
                 | 'coend(δ1)'
                 | 'beforeendof(δ1)'
                 | 'while(δ1 , δ2)'
                 | 'cross(δ1 , δ2)'
                 | 'delayed(δ1 , δ2)'
                 | 'startin(δ1 , δ2)'
                 | 'endin(δ1 , δ2)'
                 | 'overlaps(δ1 , δ2 , δ3)'
<topological>  ::= 'is equal to'
                 | 'is inside of'
                 | 'contains'
                 | 'covers'
                 | 'is covered by'
                 | 'overlaps'
                 | 'touches'
                 | 'is disjoint to'
<directional>  ::= 'is north of'
                 | 'is south of'
                 | 'is east of'
                 | 'is west of'
                 | 'is north-west of'
                 | 'is north-east of'
                 | 'is south-west of'
                 | 'is south-east of'
<distancing>   ::= 'is near to'
                 | 'is far from'
                 | 'is δm meters away from'
```

FIG. 3 shows the main subsystems of an embodiment of the invention and their dependencies. The video prototyping package 50 contains commercial, off-the-shelf video capturing 54, editing 53, compositing 52, and playback components 51. The embodiment shown in FIG. 3 makes use of existing frameworks 51 to load and play video clips in many formats, and offers rudimentary editing capabilities right in the application.

The software modeling package 60 contains Computer-Aided Software Engineering (CASE) components 62. Such components are capable of expressing formal 63 and semi-formal software models 61 and provide tools for editing them.

The implemented RAV editor, called Xrave, consists of several subsystems, each offering its own representation in the GUI.

The Movie Editor 41 allows to compose various scenes to movies and to export it as a contiguous video file. These movies represent a distinct flow of events that should provide insight on the proposed system.

The Use Case Diagram Editor 42 provides a way to view, edit, and export use case diagrams. It associates scenes with use cases and so acts also as a tool for navigating through the RAV.

The Scene Editor 32 provides a way to arrange the shots into scenes with alternatives. This is done via a directed-graph view of the shots. This graph also shows the contained signifiers. It is possible to add textual annotations to the shots. It also allows to choose which path through the shots to show of a scene, as well as drag this path to a movie in the movie editor.

The Shot Editor 33 provides a way to specify interesting perceptible parts on the video, called signifiers, that are tracked over time. For this, the Software Cinematographer first marks a rectangular region on the video and then names the signifier. This automatically sets a start and end point on the timeline, which can be moved. The rectangle can be moved and resized, and additional keyframes can be added in between. The rectangle is linearly interpolated between keyframes.

This approximation of a full-fledged tracking algorithm seems enough for demonstration purposes. The preferred embodiment will use a more exact technique.

The Sequence Editor 31 is used to model the flow of narrative events in a movie. They are represented in a notation similar to UML sequence diagrams. The Software Cinematographer can create, edit, and delete constellations and temporal relationships in this graphical editor. The semantics of these relationships are specified by defining the semiotic encoding between signifier and signified meaning. The sequence editor uses shapes adopted from LSCs to visualize the various encoding types.

The mapping of digital video to software models enables several presentation and editing modes. Movie time can be translated into a defined position in a sequence chart and vice versa. Thus, videos can be played in synchronization with these diagrams. The sequence editor implements three different presentation modes for this purpose. The first mode displays the video with a transparent diagram on top. When playing the movie, the playhead moves from top to bottom. The cut of the playhead through the chart denotes what is currently shown in the video, e.g., whether a message is sent at this moment.

The second mode is a three-dimensional-view on the RAV. For this, video is seen as a stack of frames with the movie time running from top to bottom at 25 frames per second. When watching a video, the spectator looks at this stack from roughly a 45 fi angle above. In other words, the video is projected onto a virtual screen laying in front of the spectator like a 'light table.' The sequence chart is drawn as usual, upright on the real screen. There is only one video frame visible at a time, but the action and spatial relationships between objects can be followed, nevertheless. The current movie time in the diagram is where the video layer intersects the diagram. During playback, the object boxes and their lifelines follow the positions of the signifiers in the video and the events are moving from the bottom to the top. This way, past events can be seen above and future events below the video layer.

The Knowledge Representation 20 stores all information relevant to the software models in RDF structures, which allows to relate information pieces in linguistic terms of subject, predicate, and object. This structure allows for rich searching, classification, and interchange of data and metadata. The available commercial, off-the-shelf components that support RDF are rapidly growing. Xrave uses a framework for generating, storing and querying the knowledge base which, for example, enabled sophisticated use of the search facility. Even if some property of the RAV is only stored indirectly—as a certain graph structure—it is able to find and represent it. This is achieved by spidering the entire RDF graph for a specified 'template' graph. The RDF technology facilitates the important knowledge management techniques of inferencing and deducing information from a network of facts.

The Player component 10 is capable of presenting RAVs in an interactive, non-linear manner. During the presentation of video footage on one or more Display components 11, the spectators can influence the flow of the movie via connected Controller devices 12. In simple embodiments, this may select the active path through the scene graph, but in preferred embodiments, this will be akin to the Prior Art approach of Harel and Marelly as described above: A rich base of rules that describes the reactive system assures that if a stable, non-aborting state can be reached by the right sequencing of events, this sequence is chosen for playback.

The Main Document Window

The Xrave document window is the main entry point to all top-level RAV Objects that make up an Xrave document. It enables editing the RAV data model directly. For each top-level RAV Object, there is a view that displays a short descriptive text or visualization. As shown in FIG. 4, the Xrave document window features a tabbed view that has a tab for every top-level RAV Object class. The controls for common operations, like add, edit and remove, are similar in all those tabs.

An overview of the RAV data model is given in FIG. 5. The RAV is a basic collection class that contains all top-level RAV Objects.

To create top-level objects in a RAV, all but the Signified Object subclass provide a constructor for this purpose. Newly created RAV Objects are customized by its mutator operations. Finally, they are added to the RAV via the add RAV Object: method. The RAV Object baseclass defines the common interface of all objects in a RAV. Every RAV Object has a globally unique identifier that is used to reference it throughout the Software Cinema tool kit.

There are five top-level RAV Objects: RAV Diagram, RAV Movie, Scene, Shot and Signified Object. A Signified Object—as the simplest subclass—just sets its own kind. A Shot—as the most advanced subclass—adds movie footage, metadata and signifiers to the RAV.

Movie Editor

The GUI of the movie editor is a table displaying the scene title, the shots that make up the Scene Graph Path as well as the corresponding duration. The RAV Movie can be altered using drag and drop.

New Scene Graph Paths can be added by dragging edges from the scene editor. Dragging the entries around in the table view alters the order. Pressing backspace removes the selected Scene Graph Path from the RAV Movie.

In some embodiments, the movie editor has a built-in movie viewer, with a simple timeline showing just the scenes involved.

RAV Movies are fixed runs through one or more Scenes. They represent a distinct flow of events that should provide insight on the proposed system. A RAV Movie is, at its core, an array of Scene Graph Paths, which acts as the timeline.

Use Case Diagram Editor

Use case diagrams in Xrave provide the Software Cinematographer with an overview of the system. Scenes correspond to use cases, therefore use case diagrams can be used for navigating RAVs.

Scene Editor

The scene editor has a simple two pane and toolbar layout. In the left pane, the graphical representation of the Scene Graph is shown. In the right pane there is an inspector which shows information about the selected Scene Graph Node. The user is able to edit the annotation using a standard NSText View, change the strike out state of the node as well as jump to different editors for the selected Shot or path. In the toolbar on top, there is a tool switcher to switch between 'select' and 'add edge' mode, as well as a play button which opens a viewer that plays the current path.

The approach of the reference implementation towards higher plasticity of video as described in Table 1 is to offer branched video. First, the shots are annotated and then arranged into a graph of branching video sequences. In the end-user session, the active path can be changed and the graph can be edited. One scene in Xrave corresponds to a use case in requirements engineering. All the different scenarios that constitute a use case are thus included in one scene graph. An example scene graph is shown in FIG. 6.

A scene graph has exactly one root and one end node, that are both never shown in the GUI. The nodes directly connected to these special nodes are drawn as entry and exit points of the scene. This way, many alternatives of starting and ending the use case are possible. Nodes can be placed and interconnected, but the graph is kept acyclic to ensure that every path is finite.

The scene editor supports the selection of one single object: either an edge or a node. Double-clicking an edge changes the current path to include that edge. Double-clicking a node opens the shot editor for that node and changes the current path to include that node.

Nodes can be dragged by mouse, or, when a node is selected, it can be moved using the cursor keys. Selected objects can be removed using the backspace key. Edges can be dragged as Scene Graph Paths. The dragged path is the currently active path.

Shot Editor

The shot editor allows annotating and modeling the content of video that has been captured for the Software Cinema process. It serves as the primary playback engine in end-user sessions. It can display all three structural units of RAVs: movies, scenes, and shots. Its GUI is shown in FIG. 7.

The GUI of the shot editor has two windows: the main editor window and the inspector window. A canvas—on which video is drawn—is located at the center of the main editor window. It can be zoomed using the pop-up button. A Head-up Display (HUD) overlays the canvas for augmentations of the video and can be used to add or modify signifier tracking information.

A video frame is augmented with rectangles, each of them representing a signifier. Each rectangle contains textual information about the respective signifier. The selected signifier is highlighted by the handles on its rectangle.

The toolbar provides access to drawing tools that are used to add or modify tracking information. A switching control in the toolbar controls the level of detail shown in the HUD. It offers three options: 'Off' disables the HUD, 'Annotations' shows only the name of signifiers and their signified object assignments, and 'All' shows also the bounding boxes of signifiers.

The timeline is located below the canvas and shows temporal information of signifiers and constellations. It features a playhead that indicates the current playback position. It can be zoomed using a slider, so that Software Cinematographers can choose between a compact view which fits the screen or a detailed view showing only a scrollable section of the timeline.

Playback controls are located between the canvas and the timeline. They provide the usual controls for video editing applications. The middle button starts or stops video playback. One can navigate to the start or the end of the video with the two buttons on the left side of the 'Play' button. On the right side, two buttons are located stepping through the video frame by frame. The current playback time is displayed in the text field left of the playback buttons.

The inspector window can be shown by clicking the button in the toolbar. The inspector allows to view and modify the properties of the currently selected object—signifiers or constellations—in the main editor window.

The shot editor shows video and signifier graphics on top, so it needs to compose these two streams of graphical data. It uses a transparent window which is always located over the video. The signifier graphic is drawn into this transparent window and the compositor of the operating system composes the main window and the transparent window when drawing to the screen. Cocoa supports the concept of child windows which are attached to a parent window and are always moved together.

The timeline shows the temporal information of the metadata. Its area is split into several sections. It starts with a section spanning over the complete width of the timeline, where one can click with the mouse to jump to that point of the video or one can drag the playhead around in order to scrub through the video. Below the scrubbing section, the timeline is split up into lanes, each of them showing a signifier. A rectangular area starting at the signifier's in-point and ending at its out-point depicts the temporal dimension of the signifier. If the shown signifier has keyframes, then those will be represented below the signifier with small diamonds at their positions in the video. Constellations are displayed just like signifiers in the timeline but they occupy the lanes below all signifiers and they are drawn in a different color to distinguish them visually. Each shown signifier and constellation also have a label attached to their visual representation. The label depicts the name of the item in question and the assigned object, if it is a signifier. Software Cinematographers can adjust the temporal dimension of signifiers and constellations by dragging the edges of the rectangular shapes which represent the timeline elements.

The timeline shows the temporal dimension of the video currently opened in the shot editor. It indicates the current playback position by displaying the playhead at the corresponding horizontal position. It also provides a scrubbing area where the playhead can be dragged for fast navigation through the video. The remaining area of the timeline shows the structure of the video. It can be a single shot or a sequence of shots. For each shot the timeline shows it elements, namely signifiers and constellations. The timeline serves also as the interface to edit the temporal properties of these elements.

The inspector allows the viewing and modification of properties of the currently selected signifier or constellation in the shot editor. It updates dynamically based on the current selection. Objects of two different classes can be inspected: Signifier and Constellation. Both classes require different GUIs because they do not share the same attributes. For example, instances of Signifier own keyframes whereas instances of Constellation do not. Therefore, the inspector has a different view for each class it can inspect. The view for inspecting a Signifier instance is shown in FIG. 7. When selecting an object in the main window, the class of the inspected object is determined and the content view of the inspector is set to the corresponding view. If a property of the object is changed in the inspector, then the model object will reflect the change.

Sequence Editor

The sequence editor is a diagram editor for editing sequence charts. The toolbar on top provides access to its functionality: selection and drawing tools for editing the chart, video player controls, selecting the presentation mode, and zooming of the chart as well as setting the playback rate of the video. Beneath the toolbar is the diagram and video area. This area presents the sequence charts according to the selected presentation mode. The presentation modes of the sequence editor define how the video is shown in conjunction with the chart. With each presentation mode there is a viewpoint associated as depicted in FIG. 8. A playhead visualizes the current video time in the chart. An inspector window allows editing of non-graphical metadata.

An experimental presentation mode is the 'three-dimensional' viewpoint of the sequence editor. When watching a video, the spectator looks at the video from roughly a 45 degree angle above. In other words, the video is projected onto a virtual screen laying in front of the spectator like a 'light table.' The sequence chart is drawn as usual—upright— on the real screen. There is only one video frame visible at a time, but the action and spatial relationships between objects can be followed, nevertheless. The current movie time in the diagram is where the video layer intersects the diagram. During playback, the object boxes and their lifelines follow the positions of the signifiers in the video and the events are moving from the bottom to the top. This way, past events can be seen above and future events below the video layer. FIG. 9 shows an exemplary presentation mode with a 'three-dimensional' viewpoint.

The available shapes for constructing a diagram are shown in FIG. 10.

Each signified object occurring in the scene path is represented as a box on top of the diagram area. Within this box, an icon-view shows the signifier which is associated with the object. When the video is played, this looks as if each object is tracked by a camera individually and presented on an independent, icon-sized screen. From the object boxes downwards, thin lines—also called lifelines—denote inactive objects, a thick line denotes an active object, i.e., an object that currently has an assigned signifier. Decoded constellations are shown as a rectangular box in the chart. The type of the encoding—iconified state, indexed activity, or symbolized condition—is visualized with respective shapes. The name of the constellation is shown in the center of the box.

Where constellation boxes and signifier boxes intersect, small nooks show whether the signifier is contained in the constellation or not. These nooks are graphical representations of Signifier Constellation Associations and can be deleted to remove a signifier from the constellation. A signifier can be added to a constellation by dragging it onto the signifier. Temporal relationships between time intervals are represented by arrows that are drawn with different line styles with respect to their encoding. The name of a temporal relationship is shown on top of the arrow. Some temporal relationship, such as before or while, require additional arrows to be displayed. All arrows follow the time interval patterns described by Wahl and Rothermel (Thomas Wahl and Kurt Rothermel. Representing time in multimedia systems. In *IEEE 1st. Intl. Conference on Multimedia Computing and Systems*, pages 538-243, May 1994). For example, the signified message shown in FIG. 10 is a synchronous 'open Door( )' method call. The message is followed by an acknowledgment of the receiver. The temporal relationship in this example is 'while.'

Knowledge Representation

Xrave's internal knowledge representation abstracts all data entered by the user based on the object-oriented concepts discussed previously. It is stored in an RDF model. Its class diagram is shown in FIG. 11. Other tools can access this knowledge base by querying and transforming relevant pieces to their model. This facilitates knowledge exchange between components of the tool kit and even other applications that can look beyond the perspective of the tool kit's film-centric concepts.

In a heterogeneous environment of tools, many concepts of metadata exist. An infrastructure of interchangeable data can minimize redundant tasks in data annotation. As many tools have different ways of organizing their data and metadata, a traditional 'flat' file format would neither be practicable for, nor even be capable of enabling close cooperation. The RDF technology provides a means for inferencing and deducing information from a network of facts. This form of knowledge representation has the advantage of a data storage that can be searched with powerful query languages and that can be data-mined more easily.

It is worth emphasizing that this knowledge representation is an enabling technology: the standardization of the content beyond the Xrave application to achieve a wholly interoperable tool kit is still a major challenge to other required tools. Xrave, however, is the first component of the Software Cinema tool kit to expose its object model, facilitating knowledge exchange.

Currently the implementation of Xrave uses a RDF model that is cached within a native data model for performance reasons. Handling extensive and isolated small queries for objects using RDQL would place a high burden upon the database and could slow down the user-perceived performance of the application. Manipulation of data flows through the RDF model before being cached to preserve consistency.

The RDF model is serialized to RDF/XML and stored separately from Xrave's native data model. This allows third party tools to access and extract all the knowledge gathered by Xrave, enabling them to enrich their respective models.

Operation

The most common application of the presently described embodiment will be in requirements engineering processes during end-user sessions, in which the Software Cinematographer tries to elicit as much information about the application domain as possible and iteratively refines the RAV. We then disclose what are necessary steps before and after such sessions.

A Software Cinema End-User Session

A requirements elicitation session employing the Software Cinema technique is held after enough film material has been produced to make a discussion with the end-user feasible.

The Software Cinematographer wants to discuss the current state of the visionary scenario of the system to be developed with the end-user. The Software Cinematographer points out to the end-user that what she is about to see is not to be taken for granted, but can be changed in any way she sees fit. It should give her an idea of how the developers will try to make the system work and that it will serve as their basis of reference when in doubt of minute details. So any and all comments that she might have are welcome and will be addressed appropriately. They will continue this iterative process until she feels that what is shown is a system she will want to use.

The Software Cinematographer then shows the visionary scenario, still made up from rough parts, but it contains enough material to base the story in a real-life situation that the end-user is familiar with,
shows detailed use of the system in ideal circumstances,
allude to alternative situations that might arise in the use of the system.

The end-user first watches the entire presentation quietly and passively. Afterwards she has some high-level criticism on the technical sophistication of the film, to which the Software Cinematographer can only reply that it was more important to show clear and certain points rather than to gloss over real and detailed requirements. She agrees and asks to see the scene again where she stows away the system. The Software Cinematographer brings up a static view on the movie where it is easy to see the various scenes at a. He points to one and asks if the end-user meant that one. She affirms and he starts the movie from that scene.

The end-user informs the Software Cinematographer that it would not be possible for her to lift the scanner up, because she usually carries equipment in both hands when authenticating. The Software Cinematographer selects the lifting action and brings up an annotation window where he attaches the end-user's comment. He encourages her to continue with her review right away.

The tool kit checks in the background all the possibilities of addressing the annotation that was just entered. Movie metadata about authentication actions that have been annotated before enable the tool kit to find an alternative shot where the system is attached to the wall. This shot is offered as an 'alternative' based on the matching 'authentication' action. Subsequent scenes to which no alternative shots are available, but have been annotated as clearly showing the end-user lifting up a scanner, are marked with 'continuity warning' for later correction by the Software Cinematographer.

The end-user then asks about the possibility to offer an alternative means of authentication, such as voice identification. The Software Cinematographer is surprised, because thus far he was under the impression that there was no need for other authentication methods. The end-user requests voice identification as another authentication method. The Software Cinematographer makes a note of it in the tool kit.

The tool kit adds an 'alternative stub', filling in the appropriate metadata from the related scene. This scene, if played as is, would only show a diagrammatic representation of what still needs to be filmed. Additionally, the later scenes are marked as possessing an invariant, a piece of metadata that specifies a constraint. It indicates that the conditions of the constraint must hold for the time period of the scenes.

The end-user asks if the system could be shut down automatically at the end of the scenario. The Software Cinematographer deletes the shot where she turns off the system manually. The shot that shows the system afterwards-turned off-remains, as it has previously been set as a post-condition of the scenario.

They watch the modified scenario again, but this time the end-user asks questions right away at certain decision points. The tool kit allows the Software Cinematographer to react quickly and present alternatives that the end-user inquires about on-the-fly. After a while, the end-user says that she now has a feeling of good comprehension of what the system is going to be like. They decide to adjourn the session to another day, when the Software Cinematographer has had a chance to polish some of the modifications that are now necessary.

Software Cinema Preproduction

Here we describe how the Software Cinematographer prepares, modifies, and sets up a RAV for use in a later Software Cinema session with the end-user.

The process begins after a project agreement is reached and at least one potential end-user has been identified. Typical and ideal scenarios (without exceptional conditions) are identified for the future system. A story is devised in an initial session.

In our case, the Software Cinematographer discussed the project with his boss, who just came to an agreement with a company that produces consumer electronics. He tells the Software Cinematographer that from their focus groups, a certain end-user has been found to participate in the requirements engineering sessions. The Software Cinematographer makes an appointment with the end-user to get a first impression of what the envisioned system will probably have to do. He follows her with a video camera while she improvises the desired functionality.

Various kinds of potentially useful background information can be added to these video clips as metadata. The metadata is extensible to include as-of-yet unknown datatypes, such as positional and pose data of three-dimensional-scanners that are used simultaneously to a common video camera. This metadata is used for indexing and searching, but more importantly for connecting clips together logically.

In our example, the Software Cinematographer makes short voice annotations during the improvised scenario. In a simple embodiment, he holds a marker into the field of view while he speaks, so that those annotations can easily be found by the tool kit. However, in the preferred embodiment, custom devices are used to add annotations automatically or semi-automatically to the videos during recording.

The tool kit allows to annotate clips in multiple ways and with a strong focus on developer's needs. It allows to identify pixel regions in the clip and assign identifiers to them, so that the movie becomes 'clickable' and objects that are seen can be selected directly on screen. These objects are in preferred embodiments also shown in a diagrammatical view, so that object relationships can be easily added and modified.

Back in his office, the Software Cinematographer loads everything he filmed into the tool kit, which already separates the action shots from the annotation shots. He then points out the obvious objects and actors by drawing outlines directly on keyframes of the clips and assigns names to them. The tool kit notifies him as soon as it has enough data to robustly identify these objects automatically (such as by color value and shape).

The Software Cinematographer has another close look at the clips and also listens to his annotations again to detect any hints to background information that the end-user gave away. For example, the end-user said that she wouldn't want the scanner to be bigger than her cell phone. He adds these kinds of information to the requirements model that is incrementally built with the tool kit.

The final shot that shows the system in turned-off state, for example, is set to be the post condition of the scenario. Therefore, the tool kit can ascertain that all modifications done during the Software Cinema end-user session still make the scenario culminate in that shot.

It is possible at any point to watch the movie, inconsistencies are never cause for interruptions. If the system detects inconsistencies, they are shown as warnings, but the underlying models do not have to be complete or consistent for the Software Cinematographer to work with them. Any shot can be added as an 'alternative.' There are two kinds of alternatives: Either the shot is logically in parallel to other shots of the scene, or it is an optional shot, only shown if certain conditions are met.

Software Cinema Postproduction

Here we describe how the Software Cinematographer polishes and finishes the RAV for ratification by the end-user and presentation to the developers.

The Software Cinematographer now has a substantial amount of video clips that show one complete scenario of the system. Furthermore, several alternatives, exceptional behavior, and forbidden behavior is also available in video clips. For ratification of the RAV, the Software Cinematographer selects a linearization of these clips out of the graph that has been built during the Software Cinema end-user sessions. In other words, after this step, the entire RAV can be watched in one go, but interesting alternatives are shown automatically.

After the end-user agrees that this is a good representation of how the system should ideally behave, the RAV is handed over to the developers. They can navigate through the video clips by making selections at certain decision points, or can directly jump to specific scenes that are accessible from diagrammatic views.

Some embodiments of the invention offer more exporter components that allow to continue a development process based on the developed models. These are human-readable formats such as requirements analysis documents or machine-readable formats such as RDF or XMI.

Further Description of Operation

We restrict the model space to 'anything that can be shown in film'—a limitation that we accept, as with today's digital video tools, almost anything that can be imagined can be shown in film. Then we describe how to use film media as models and how contradictions can be handled by introducing the concept of alternative shots. The nature of the Software Cinema technique is not a matter of abstraction, but rather a matter of richness. The real worlds of experience and imagination are far richer and more complex than what can be conceptualized and represented in such modeling notations as UML. Abstract models—by definition—have to eliminate the ambiguities and inconsistencies of the worlds of experience and imagination. Further development of ever more abstract models on top of UML, that can be automatically transformed to implementations, might not be able to bring vision and reality closer together.

The Software Cinema process is presented in 12, 13, and 14: For the sake of explanation, a distinction is made between innovative, $1^{st}$-system development and enhancement or reengineering projects. In effect, both perspectives are relevant to some embodiments of the invention and will be used in combination in some of these embodiments. $1^{st}$-systems are those that have never been built before and are only dependent on an existing environment to operate in, as opposed to the systems that need to be reengineered from existing solutions.

FIG. 12 shows a preferred embodiment for reengineering projects whereas FIG. 13 shows a preferred embodiment for innovative, $1^{st}$-system development. When someone, possibly a future end-user, identifies the need for a new system and can provide the funds to realize it, the process begins with a problem statement.

We make an important distinction between two different stakeholders in the end-user's organization. For the kind of system that the Software Cinema technique is destined, the person controlling the funds is most likely a different person from the one who will use the system in the end. Some embodiments of this invention will focus on such development processes, but there might be cases where established processes for customer-relationship management might benefit from a Software Cinema-based project, too.

The Software Cinematographer, a member of the developer organization, is in charge of requirements analysis. As first task, the problem is analyzed and developed into as-is scenarios that provide the foundation for requirements analysis. A new software engineering role of video producer, and—preferably—an entire creative or film department, staffed with trained professionals of the film or video industry, is in charge of shooting video clips. While the described process assumes that the system under development is a $1^{st}$-system, it also assumes that the developer organization has used the Software Cinema technique before. Therefore, the video producer and Software Cinematographer already possess a library of clips from earlier projects that are potentially 'tropeable' and could be reused for the current project. A good option for video producers would be to hire a specialized film agency, whose first task is to identify a striking as-is scenario and create a script and storyboard in close cooperation with end-users. Eventually, a large clip database of everyday situations of typical end-users might be referred to, as well. Apart from saving shooting time, this would also encourage the identification of exceptional states of visionary systems and the addition of these to the described as-is scenario.

The end-user-approved script is then filmed and edited, but these standard tasks of film agencies are slightly augmented, as required by the downstream process. Especially the employment of standardized file formats for all artifacts that can be embedded in the visionary scenario and some meta-data capture are the most significant.

By embedding all background information, which lead to shooting, framing, or even scenario selection, the software engineers obtain a rich pool of information about the application domain and the verified vision of end-users. Another possibility that this meta-data enables is addition of interactive elements to the visionary scenario. The film would begin with the same introductory scenes, but then show several alternatives, depending on selection of the viewer. This kind of description is easily understood by humans, and can therefore prevent misunderstandings about certain system behaviors.

Probing the raw material and moving from rough edits to the visionary scenario, digital visual effects are introduced. For example, compositing, the simultaneous overlaying of different clips, can be used to show visionary user interfaces over real backgrounds. An advantage of this technique is, that the description of the visionary scenario is much closer to the actual experience. Additionally, several dimensions of description are available. Apart from visible system components and a course of events, this description can still be inconsistent at the model level, but appear reasonable to end-users nevertheless. This means that we now have a possibility, even more as with standard GUI prototypes, to convey the experience of using a system that does not yet exist.

CONCLUSION, RAMIFICATIONS, AND SCOPE

The focus of some embodiments of our invention is to apply a new theory on how to combine film and software models to a realistic software development scenario. The theory provides the foundation, basic design, and inspiration for the custom-built Xrave component of the Software Cinema tool kit and a guideline for how to use commercial, off-the-shelf components in preferred embodiments. In essence, the theory regards video as a model that is closest to end-users and offers guidance as to how this model maps to computer-based implementations. If real end-users talk about their application domain, standard terminology and therefore a possibility for pattern-recognition of keywords and phrases can not be assumed. More often, the 'Thesaurus' problems of synonyms and homonyms—different words for the same concept or identical words for different concepts—will actually pose a threat to successful communication about the application domain. This is of course reduced when one eliminates the need for written or spoken words: The video of a concept simply shows the concept, no matter the language or the expressions used to describe it. But there is a downside, as well. Words written on paper can be read as slowly or as quickly as one chooses. Video is volatile. If the end-user misses an important part, or pays attention to a different signifier at the time, video makes it harder to 'read' the specification again.

Originally, the Software Cinema technique was meant to help in bridging the gap between end-users and analysts in the earliest phases of a project. When nothing has been made clear yet, and innovative and creative ideas are required of the stakeholders, we sometimes noticed an effect that became known as 'analysis paralysis.' The complexity of a problem, the size of the application domain, and the diverging viewpoints of the participating stakeholders all seem overwhelming to the analysts. As a consequence, it feels uncomfortable and unproductive to discuss at length what a theoretical solution could be like. Complex models loom threatening over everyone's head, especially when discussed with developers who fear that the complexity will require unthinkable amounts of time and resources to get the system done. To mitigate this fact, a more human representation of the application domain seems well-suited. It makes explicit the vagueness of early software specifications by not hiding them behind nearly incomprehensible formalities. At the same time, it shows directly what the role, look and feel, and the implementation of the system should be like. When developers pair this fact with the assumption that end-users ratified the vision, that what they saw is what they really want to get, it becomes a useful resource of reference.

Although the description above contains many specificities, these should not be construed as limiting the scope of the invention but as merely providing illustrations of some of the possible embodiments of this invention. Thus the scope of the invention should be determined by the appended claims and their legal equivalents, rather than by the examples given.

The invention claimed is:

1. A method for automatically transforming a rich film into at least one model for developing a product or process,
   the rich film, comprising:
      at least one shot, comprising:
         a sequence of time-based media;
            at least one signifier, the signifier being an element that is perceptible within the shot during a time interval; and
            at least one constellation, wherein the constellation representing a spatial relationship involving at least one signifier;
   the at least one model, comprising:
      a plurality of use case steps, wherein each use case step describing a step that is allowed to occur during the use of the product or process; and
      an object-oriented model and the signifier is represented in the object-oriented model as at least one of a signified object, a state internal to an object, a class, and an alternative solution;
   the method, comprising for each shot contained in the rich film,
      representing the shot as at least one use case step in the at least one model;
      representing for each signifier contained in the shot, in the at least one model as at least one of a signified object, a state, a concept, and an alternative solution; and
      representing each constellation contained in the shot, in the at least one model as at least one of a state, a topology, an activity, a condition, a relationship, a concept, and an anti-scenario.

2. The method of claim 1, wherein the at least one shot further comprises at least one chronology, the chronology representing a temporal relationship involving at least two elements, the method further comprising, for each shot contained in the rich film, for each chronology contained in the shot, representing the chronology in the model as at least one of a sequence, a message, an assignment, a synchronization, a threading, a concurrency, and a parallelism.

3. The method of claim 1, wherein the rich film comprises the time-based media and metadata.

4. The method of claim 1, wherein the time-based media comprises at least one of video, audio, and animations.

5. The method of claim 1, wherein the time-based media comprises at least one of motion paths and event traces.

6. The method of claim 1, wherein the at least one model describes at least one of a requirement, a business use case, a system use case, an activity, a sequence, and object structure, a class structure, an organization, and a deployment.

7. The method of claim 1, wherein the automatic transforming of the rich film into the at least one model is based on at least one of a translation table, and a formal grammar specification.

8. A computer program product comprising a plurality of program instructions for execution by at least one processor, wherein the program instructions cause the at least one processor to perform the method according to claim 1.

* * * * *